US 7,672,245 B2

(12) United States Patent
Yasuie et al.

(10) Patent No.: US 7,672,245 B2
(45) Date of Patent: Mar. 2, 2010

(54) METHOD, DEVICE, AND SYSTEM FOR DETECTING LAYER 2 LOOP

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 250 days.

(21) Appl. No.: 11/788,686

(22) Filed: Apr. 20, 2007

(65) Prior Publication Data

US 2008/0080398 A1    Apr. 3, 2008

(30) Foreign Application Priority Data

Sep. 29, 2006    (JP) .............................. 2006-268496

(51) Int. Cl.
*H04L 12/26*    (2006.01)
*H04L 12/28*    (2006.01)
*H04L 12/56*    (2006.01)

(52) U.S. Cl. .................. 370/249; 370/389; 370/395.21

(58) Field of Classification Search ........................ None
See application file for complete search history.

(56) References Cited

U.S. PATENT DOCUMENTS 6,810,021 B1 * 10/2004 Sakurai ...................... 370/255
2005/0220036 A1   10/2005 Sugitani et al.
2006/0013141 A1   1/2006 Mutoh et al.
2006/0126517 A1   6/2006 Kurosaki et al.

FOREIGN PATENT DOCUMENTS

| JP | 2001-197114 | 7/2001 |
| JP | 2004-364065 | 12/2004 |
| JP | 2005-295209 | 10/2005 |
| JP | 2006-33275  | 2/2006 |
| JP | 2006-173785 | 6/2006 |

OTHER PUBLICATIONS

Takeshi Yasuie, et al. Remote Diagnosis Method of Broadcast Storm in Ethernet, Fujitsu Laboratories Ltd., May 2006.

* cited by examiner

*Primary Examiner*—Gregory B Sefcheck
*Assistant Examiner*—Nima Mahmoudzadeh
(74) *Attorney, Agent, or Firm*—Katten Muchin Rosenman LLP

(57) ABSTRACT

A request-packet transmitting unit transmits a predetermined number of request packets having a non-unicast destination address that can be received by a target network including a network identified by a first network address, from a monitoring network identified by a second network address different from the first network address through a layer 3 relay device. A layer 2 loop detecting unit receives response packets corresponding to transmitted request packets through the layer 3 relay device, and detects a layer 2 loop in the target network based on number of received response packets and number of transmitted request packets.

12 Claims, 15 Drawing Sheets

FIG.3

| TIME | NETWORK TO BE DETECTED | NON-UNICAST ADDRESS | NUMBER OF REQUEST PACKETS |
|---|---|---|---|
| 2006.8.1 12:00 | 172.16.1.0 | 172.16.1.255 | 10 |
| ⋮ | ⋮ | ⋮ | ⋮ |

FIG.4

| TIME | TRANSMISSION-SOURCE ADDRESS | NUMBER OF RESPONSE PACKETS |
|---|---|---|
| 2006.8.1 12:00 | 172.16.1.1 | 1,000 |
| ⋮ | ⋮ | ⋮ |

FIG.5

| TIME | NETWORK TO BE DETECTED | NUMBER OF REQUEST PACKETS | TRANSMISSION-SOURCE ADDRESS | NUMBER OF RESPONSE PACKETS | DETECTING RESULT |
|---|---|---|---|---|---|
| 2006.8.1 12:00 | 172.16.1.0 | 10 | 172.16.1.1 | 1,000 | OCCUR |
| ... | ... | ... | ... | ... | ... |

FIG.14

| ROUTING PROTOCOL | MAXIMUM MONITORING PERIOD (SECOND) |
|---|---|
| RIPv1 | 240 |
| OSPF | 40 |
| EIGRP | 15 |
| ⋮ | ⋮ |

000
METHOD, DEVICE, AND SYSTEM FOR DETECTING LAYER 2 LOOP

BACKGROUND OF THE INVENTION

1. Field of the Invention

This invention relates to a method, device, and system for detecting a layer 2 loop.

2. Description of the Related Art

In a network that is constituted of using a layer 2 switch, "a layer 2 loop" that occurs due to false connection between cables or a failure of a device is conventionally recognized as one hazardous fault. When a layer 2 loop occurs, the whole area of broadcast domain (a range that broadcast packets reach) such as a subnet is flooded with a large quantity of broadcast packets. As a result, for example, a terminal performs processing that it receives a large quantity of broadcast packets once, checks information in an upper layer about each broadcast packet, and then discards them. Therefore, a high load is imposed on the terminal. A band is occupied by a large quantity of broadcast packets in a network, which may cause communication to put in an impossible condition. Along with wider Ethernet (trademark) or prevalence of virtual local area network (VLAN), a layer 2 loop that causes such difficulties becomes a more serious problem.

A method of using spanning-tree protocol (STP) prescribed in IEEE802.1D is considered to prevent occurrence of a layer 2 loop. However, it is necessary for a relay device such as a layer 2 switch to support STP and to keep a function of STP in operation all the time. Therefore, the method may be difficult to use based on environments of a network or an operation policy and is not a suitable solution. A method of introducing a relay device such as a layer 2 switch that has a function of preventing occurrence of a layer 2 loop is also considered to prevent occurrence of a layer 2 loop, however, because it is necessary to replace all of existing layer 2 switches, to realize introduction of the device is difficult and the method is also not a suitable solution.

Various methods to detect a layer 2 loop are proposed as disclosed in Japanese Patent Application Laid-Open No. 2001-197114, Japanese Patent Application Laid-Open No. 2006-33275, Japanese Patent Application Laid-Open No. 2004-364065, and Japanese Patent Application Laid-Open No. 2006-173785.

In the above conventional methods, a detecting device connected to a network to be detected or a detecting device included in a layer 2 switch to be detected analyzes packets received in the network to be detected or in the layer 2 switch to be detected to detect a layer 2 loop. A problem arises in that a layer 2 loop cannot be detected that occurs in a network different from the network to which the detecting device is connected (a network having a different network address, for example, a different subnet).

A method of connecting a detecting device to all of networks or a method that a network manager reaches a network in which a layer 2 loop is suspected to occur (a suspected network) and connects a detecting device to the suspected network is considered, however, the above problem cannot be solved in a suitable way.

SUMMARY OF THE INVENTION

It is an object of the present invention to at least partially solve the problems in the conventional technology.

A device according to one aspect of the present invention is for detecting a layer 2 loop in a network identified by a first network address that is divided by a layer 3 relay device that relays a packet at layer 3. The device includes a request-packet transmitting unit that transmits a predetermined number of request packets having a non-unicast destination address that can be received by a target network that includes the network identified by the first network address, from a monitoring network identified by a second network address different from the first network address to the network identified by the first network address, through the layer 3 relay device; and a layer 2 loop detecting unit that receives response packets corresponding to the request packets transmitted by the request-packet transmitting unit, through the layer 3 relay device, and detects the layer 2 loop in the target network based on number of received response packets and number of transmitted request packets.

A system according to another aspect of the present invention includes a layer 2 loop detecting device that detects a layer 2 loop in a network identified by a first network address that is divided by a layer 3 relay device that relays a packet at layer 3. The layer 2 loop detecting device includes a request-packet transmitting unit that transmits a predetermined number of request packets having a non-unicast destination address that can be received by a target network that includes the network identified by the first network address, from a monitoring network identified by a second network address different from the first network address to the network identified by the first network address, through the layer 3 relay device, and a layer 2 loop detecting unit that receives response packets corresponding to the request packets transmitted by the request-packet transmitting unit, through the layer 3 relay device, and detects the layer 2 loop in the target network based on number of received response packets and number of transmitted request packets. The layer 3 relay device includes a response-packet transmitting unit that transmits the response packets corresponding to request packets transmitted by the request-packet transmitting unit to the layer 2 loop-detecting device.

A method according to still another aspect of the present invention is for detecting a layer 2 loop in a network identified by a first network address that is divided by a layer 3 relay device that relays a packet at layer 3. The method includes transmitting a predetermined number of request packets having a non-unicast destination address that can be received by a target network that includes the network identified by the first network address, from a monitoring network identified by a second network address different from the first network address to the network identified by the first network address, through the layer 3 relay device; receiving response packets corresponding to the request packets transmitted at the transmitting, through the layer 3 relay device; and detecting the layer 2 loop in the target network based on number of received response packets and number of transmitted request packets.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table for explaining a number-of-transmitted request packet storing unit;

FIG. 4 is a table for explaining a number-of-received response packet storing unit;

FIG. 5 is a table for explaining a layer 2 loop detecting result storing unit;

FIG. 14 is a table for explaining a monitoring period determined based on a routing protocol according to a seventh embodiment of the present invention;

DETAILED DESCRIPTION OF THE PREFERRED EMBODIMENTS

Exemplary embodiments of the present invention will be explained in detail below with reference to the accompanying drawings. A description of a non-unicast address means to include a broadcast address and a multicast address in the present invention.

"A layer 2 loop" is one of hazardous failures caused by false connection between cables or a failure in a device in a network constituted by using a layer 2 switch. When "a layer 2 loop" occurs, broadcast packets sent from a terminal based on an address resolution (ARP: address resolution protocol) of transmission control protocol/Internet protocol (TCP/IP) round a loop, for example, when the packets pass through a relay device in which "a layer 2 loop" occurs and are sent into a broadcast domain whenever they round a loop. Because the roundness of a loop is performed at wire speed, the number of broadcast packets sent from the relay device to the broadcast domain is amplified at wire speed and the whole area of broadcast domain is flooded with a large number of broadcast packets. This behavior is recognized as a behavior characteristic to "a layer 2 loop".

The broadcast domain means a range that the broadcast packets can reach. More specifically, it means a network that is identified by a network address divided by "a layer 3 relay device" (for example, a router) that relays packets at layer 3. In Internet protocol version 4 (IPv4), a bit string of 32 bits that are divided into 4 for each 8-bit portion is used as an IP address. In the bit string of 32 bits, a portion that is used for identifying a network (or a subnet) is a network address. For example, in consideration of "172. 16. 1. 1/24", the first 24 bits indicate a network address and the network address is "172. 16. 1. 0".

That is, the behavior of "a layer 2 loop" is recognized in the whole area of network identified by the network address that is divided by "the layer 3 relay device". Just in other words, the behavior of "a layer 2 loop" is not recognized in a network identified by a network address different from that of the network in which a layer 2 loop occurs. Thus, in the layer 2 loop detecting device connected to a network (for example, a different subnet and the like) that is identified by another network address, the behavior of "a layer 2 loop" generally can not detected. It is impossible to detect that "a layer 2 loop" occurs. Accordingly, in the layer 2 loop detecting device connected to a network that is identified by another network address, it is important how to implement a mechanism of detecting a layer 2 loop that occurs in a different network.

Figure 1:
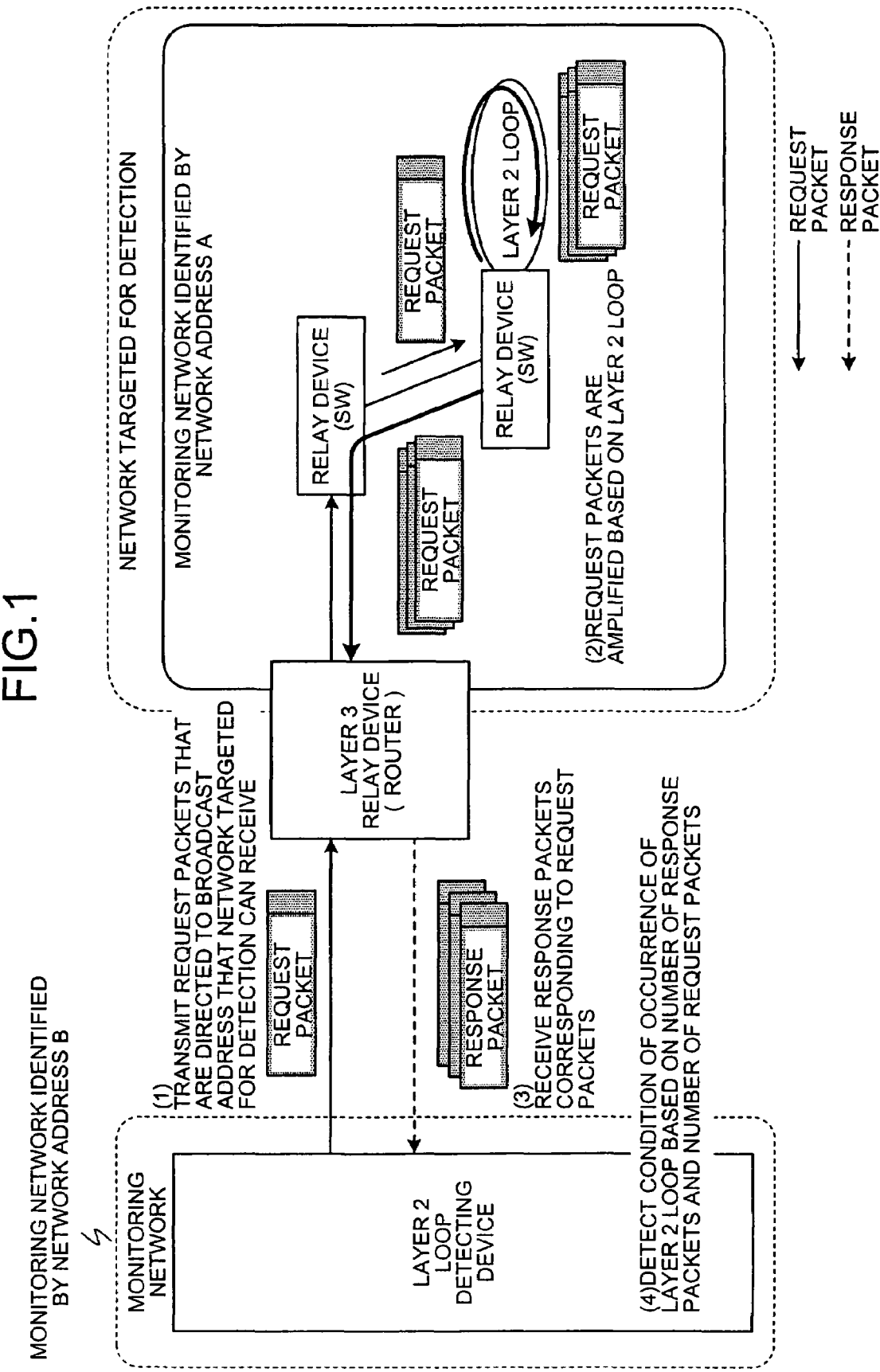
FIG. 1 is a schematic for explaining an outline and a characteristic of a layer 2 loop detecting device according to a first embodiment of the present invention.

FIG. 1 is a schematic for explaining the outline and characteristic of the layer 2 loop detecting device according to a first embodiment of the present invention.

The layer 2 loop detecting device according to the first embodiment has an outline, as described above, of detecting a condition of occurrence of a layer 2 loop in the network that is identified by the predetermined network address divided by the layer 3 relay device that relays packets at layer 3, and has a main characteristic of detecting a layer 2 loop that occurs in a network different from the network to which the detecting device is connected (a network having a different network address, for example, a different subnet and the like).

A simple explanation of the main characteristic is first given about one network as a network to be detected that is identified by a network address A divided by the layer 3 relay device according to the first embodiment shown in FIG. 1. For example, the network to be detected is one network identified by the network address "172. 16. 1. 0". In addition, according to the first embodiment, the layer 2 loop detecting device, as shown in FIG. 1, is connected to a monitoring network identified by a network address B that is different from the network address A. For example, the monitoring network is a network identified by a network address "192. 168. 100. 0". According to the first embodiment, there is an assumption that a layer 2 loop occurs in the network identified by the network address "172. 16. 1. 0".

Under this configuration, the layer 2 loop detecting device according to the first embodiment transmits a certain number of request packets that are directed to a broadcast address that the network to be detected can receive through the layer 3 relay device to the network to be detected (see (1) in FIG. 1). For example, the layer 2 loop detecting device transmits 10 Pings directed to a broadcast address of "172. 16. 1. 255" that the network to be detected can receive.

According to the first embodiment, because a layer 2 loop occurs in the network identified by the network address of "172. 16. 1. 0", the 10 Pings transmitted from the layer 2 loop detecting device are amplified by the layer 2 loop (see (2) in FIG. 1).

Then, the layer 2 loop detecting device according to the first embodiment receives response packets corresponding to the transmitted request packets through the layer 3 relay device (see (3) in FIG. 1). For example, the layer 2 loop detecting device receives 1000 Ping responses.

The layer 2 loop detecting device employs the number of received response packets and the number of transmitted request packets to detect a condition of occurrence of a layer 2 loop in the network to be detected (see (4) in FIG. 1). The layer 2 loop detecting device according to the first embodiment detects that a layer 2 loop occurs as a condition of occurrence of a layer 2 loop when the number of response packets that have the same transmission-source address among the received response packets is larger than the number of the transmitted request packets. For example, the layer 2 loop detecting device employs 1000 response packets that have the same transmission-source address among the received response packets and 10 transmitted request packets to detect that a layer 2 loop occurs because the number of response packets is larger than the number of transmitted request packets.

As a result, the layer 2 loop detecting device according to the first embodiment can detect a layer 2 loop that occurs in a network different from the network to which the detecting device is connected (a network that has a different network address, for example, a different subnet and the like).

Figure 2:
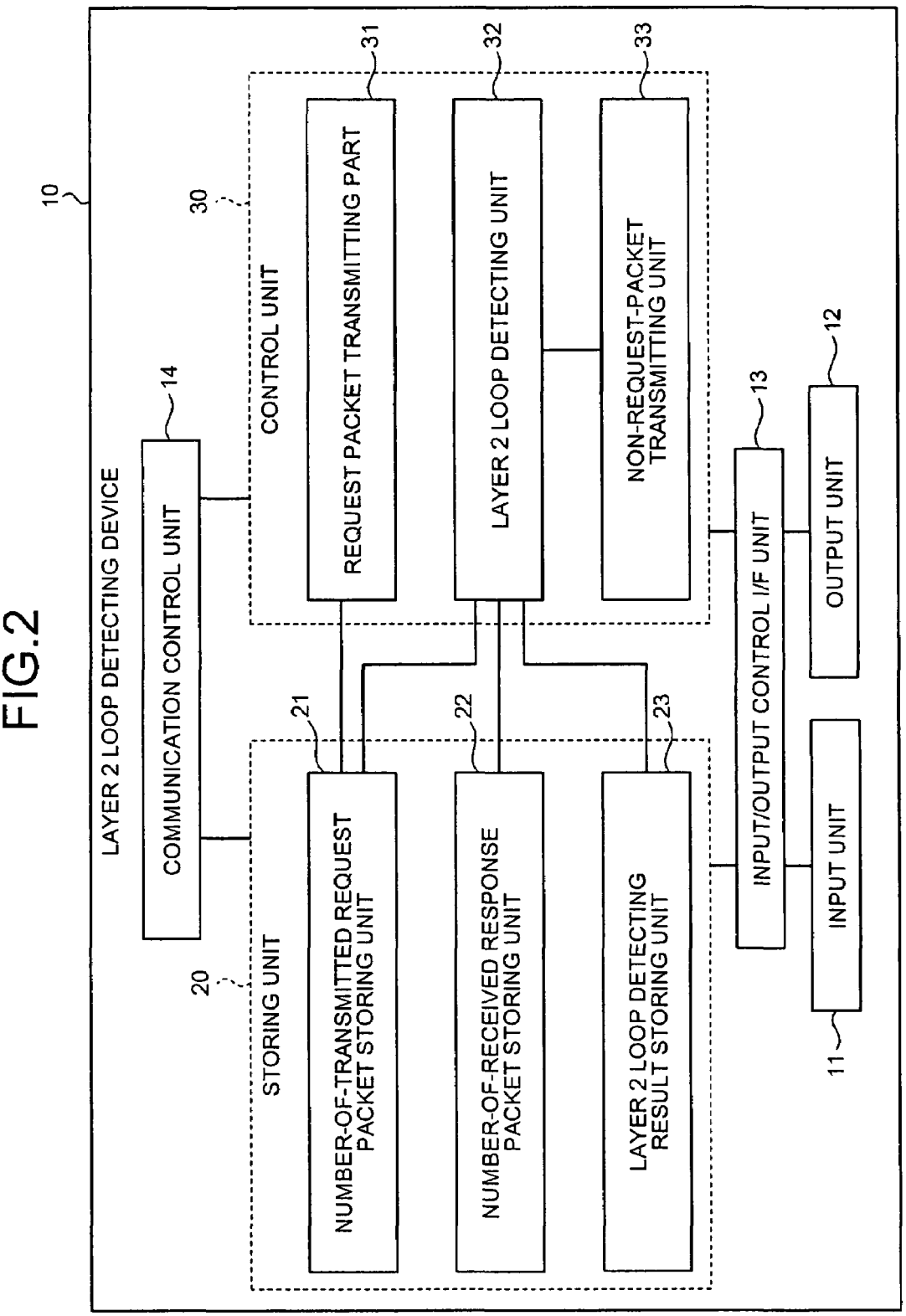
FIG. 2 is a block diagram for explaining a configuration of the layer 2 loop detecting device according to the first embodiment.

As shown in FIG. 2, a layer 2 loop detecting device 10 mainly includes an input unit 11, an output unit 12, an input/output control I/F unit 13, a communication control unit 14, a storing unit 20, and a control unit 30.

The input unit 11 inputs data that the control unit 30 uses in various processing, operation instructions to perform various processing, and the like through a key board or a storing medium. For example, in the input unit 11, a command of specifying a destination address, a packet length, and the number of request packets with regard to request packets transmitted by a request-packet transmitting unit 31 is input through the key board and the input command is transmitted to the request-packet transmitting unit 31.

The output unit 12 outputs results of various processing performed by the control unit 30 and operation instructions to perform various processing to a monitor, a printer, or the like. For example, the output unit 12 outputs the command input by the input unit 11, how the command is being performed (for example, how response packets are received), and detection results stored in a layer 2 loop detecting result storing unit 23.

The input/output control I/F unit 13 controls data transmission between the input unit 11 and the output unit 12, and between the storing unit 20 and the control unit 30.

The communication control unit 14 performs communication when the layer 2 loop detecting device 10 accesses another device in the network through the network. More specifically, the communication control unit 14 performs communication through a local area network (LAN) board. For example, the communication control unit 14 transmits request packets transmitted by the request-packet transmitting unit 31 to a network and receives response packets from the network to transmit them to a layer 2 loop detecting unit 32.

The storing unit 20 is a storing means that stores data used for various processing performed by the control unit 30. The storing unit closely associated with the present invention includes, as shown in FIG. 2, a number-of-transmitted request packet storing unit 21, a number-of-received response packet storing unit 22, and the layer 2 loop detecting result storing unit 23.

The number-of-transmitted request packet storing unit 21 stores the number of request packets transmitted from the layer 2 loop detecting device 10 to the network to be detected. More specifically, the number-of-transmitted request packet storing unit 21 stores the number of request packets transmitted by the request-packet transmitting unit 31 and the number of stored request packets is used for processing performed by the layer 2 loop detecting unit 32.

For example, the number-of-transmitted request packet storing unit 21 operates a relational database management system (RDBMS) program and the like and, as shown in FIG. 3, time when request packets are transmitted, a network address contained in the network to be detected, a non-unicast address that is a destination address of request packets, and the number of transmitted request packets are associated with one another to store therein. The method of associating the above information with one another to store it in the number-of-transmitted request packet storing unit 21 of the first embodiment is explained, however, the present invention is not limited to the method. If a method by which it is confirmed that the number of request packets and the number of response packets are associated with each other in the layer 2 loop detecting unit 32 is used such as a method that only the time and the number of request packets are associated with each other to store, any information that the number-of-transmitted request packet storing unit 21 stores is satisfied. With regard to such information that the number-of-transmitted request packet storing unit 21 stores, the stored information can be deleted at any timing by using a method that the information is deleted immediately after it is used for processing performed by the layer 2 loop detecting unit 32, a method that the information is stored as a log without being deleted for a certain period, and the like.

The number-of-received response packet storing unit 22 stores the number of response packets that the layer 2 loop detecting device 10 receives. More specifically, the number-of-received response packet storing unit 22 stores the number of response packets that the layer 2 loop detecting unit 32 receives (response packets corresponding to request packets that the request-packet transmitting unit 31 transmits) and the number of stored response packets is processed by the layer 2 loop detecting unit 32.

For example, the number-of-received response packet storing unit 22 operates the RDBMS program to associate time when the response packets are received, a transmission-source address contained in the response packets, and the number of response packets that have the same transmission-source address with one another to store them shown in FIG. 4. The method of associating the above information with one another to store it in the number-of-received response packet storing unit 22 of the first embodiment is explained, however, the present invention is not limited to the method. If a method by which it is confirmed that the number of request packets and the number of response packets are associated with each other in the layer 2 loop detecting unit 32 is used such as a method that only the time and the number of response packets are associated with each other to store, any information that the number-of-received response packet storing unit 22 stores is satisfied. With regard to such information that the number-of-received response packet storing unit 22 stores, the stored information can be deleted at any timing by using a method that the information is deleted immediately after it is used for processing performed by the layer 2 loop detecting unit 32, a method that the information is stored as a log without being deleted for a certain period, and the like.

The layer 2 loop detecting result storing unit 23 stores the detected result that the layer 2 loop detecting device 10 detects (a condition of occurrence of a layer 2 loop in the network to be detected). More specifically, the layer 2 loop detecting result storing unit 23 stores "a condition of occurrence of a layer 2 loop" that is detected by the layer 2 loop detecting unit 32 and the stored "condition of occurrence of a layer 2 loop" is output to a monitor through the output unit 12.

For example, the layer 2 loop detecting result storing unit 23 operates the RDBMS program to associate time when "a condition of occurrence of a layer 2 loop" is detected, a network address of the network that is contained in the network to be detected, the number of the transmitted request packets, the number of response packets that have the same transmission-source address, and the detected results with one another to store them shown in FIG. 5. The method of associating the above information with one another to store it in the layer 2 loop detecting result storing unit 23 of the first embodiment is explained, however, the present invention is not limited to the method. If a method that information that is needed for a network manager that operates the layer 2 loop detecting device 10 is stored such as a method that the time, the network address, and the detected result are associated with one another to store them is used, any information that the layer 2 loop detecting result storing unit 23 stores is satisfied. With regard to such information that the layer 2 loop detecting result storing unit 23 stores, the stored information can be deleted at any timing by using a method that the information is deleted after a certain period elapses, a method that the information is deleted by an instruction of a network manager, and the like.

The control unit 30 is a control means that controls the layer 2 loop detecting device 10 and performs various processing. The control unit closely associated with the present invention includes, as shown in FIG. 2, the request-packet transmitting unit 31, the layer 2 loop detecting unit 32, and a non-request-packet transmitting unit 33. The request-packet transmitting unit 31 corresponds to "a request-packet transmitting unit" described in claim, the layer 2 loop detecting unit 32 corresponds to "a layer 2 loop detecting unit" described in claim, and the non-request-packet transmitting unit 33 corresponds to "a non-request-packet transmitting unit" described in claim.

The request-packet transmitting unit 31 transmits request packets, with respect to the network to be detected, that have a non-unicast address as a destination address that can be received by the network to be detected. More specifically, when the request-packet transmitting unit 31 receives a command input by the input unit 11, the request-packet transmitting unit 31 transmits a predetermined number of request packets, from the communication control unit 14, that have a non-unicast address as a destination address that can be received by the network to be detected with respect to the network to be detected including the network identified by a predetermined network address. The request-packet transmitting unit 31 makes the number-of-transmitted request packet storing unit 21 store information about transmitted request packets (for example, time when request packets are transmitted, a network address of the network that is contained in the network to be detected, a non-unicast address that is a destination address of request packets, and the number of transmitted request packets).

The layer 2 loop detecting device is connected to a monitoring network that is identified by a network address different from the network address of the network (for example, a subnet and the like) contained in the network to be detected. Therefore, the request-packet transmitting unit 31 transmits request packets from the monitoring network to the network to be detected through the layer 3 relay device.

For example, when the request-packet transmitting unit 31 receives a command of "ping 172. 16. 1. 255-n 10-1 1500" input by the input unit 11, a Ping request whose number is ten and whose packet length is 1500 bytes (ICMP echo request: Internet control message protocol echo request) is transmitted with respect to the network to be detected of "172. 16. 1. 0". The request-packet transmitting unit 31 of the first embodiment sets a packet length of request packets to a predetermined packet length (1500 bytes) for transmission. In this event, it is possible to alleviate an increased load of the device along with detection of layer 2 loop (an increased load by adding a load of processing request packets transmitted by the layer 2 loop detecting device). That is, a load of the device that processes packets is proportional to the number of transmitting and receiving packets per hour. Therefore, for example, a predetermined packet length having a long size such as 1500 bytes is specified, enabling a reduction in an increased load of the device.

According to the first embodiment, the method that the request-packet transmitting unit 31 transmits a Ping request (ICMP echo request) as request packets is explained; however, the present invention is not limited to the method. The present invention can be applied in the same way to the method of transmitting request packets that are directed to a non-unicast address to which the relay device or the terminal responds such as a method of transmitting, for example, an SNMP request (SNMP get request: simple network management protocol get request) as request packets, an ICMP request except Ping, an NetBIOS request (NetBIOS: network basic input/output system), or an SSDP request (SSDP: simple service discovery protocol). When each device is set not to respond to a Ping request in terms of securities, it is efficient to use another method such as a method of transmitting an SNMP request.

Furthermore, according to the first embodiment, the method that the request-packet transmitting unit 31 transmits by specifying a packet length of request packets to 1500 bytes is explained; however, the present invention is not limited to the method. Either a method of transmitting by specifying another packet length or a method of transmitting without specifying a packet length can be used. According to the first embodiment, the method that the request-packet transmitting unit 31 transmits 10 request packets is explained; however, the present invention is not limited to the method. Any number of request packets can be transmitted.

The layer 2 loop detecting unit 32 receives response packets corresponding to request packets and detects "a condition of occurrence of a layer 2 loop" in the network to be detected. More specifically, the layer 2 loop detecting unit 32 receives, from the communication control unit 14, response packets corresponding to request packets transmitted by the request-packet transmitting unit 31 and makes the number-of-received response packet storing unit 22 store information about the received response packets (for example, time when response packets are received, a transmission-source address contained in the response packets, the number of response packets having the same transmission-source address, and the like). When the number of response packets (response packets having the same transmission-source address) stored in the number-of-received response packet storing unit 22 is larger than the number of request packets stored in the number-of-transmitted request packet storing unit 21, the layer 2 loop detecting unit 32 detects that a layer 2 loop occurs as "a condition of occurrence of a layer 2 loop" in the network to be detected and makes the layer 2 loop detecting result storing unit 23 store the detected results. When the layer 2 loop detecting unit 32 of the first embodiment detects that a layer 2 loop occurs, the layer 2 loop detecting unit 32 transmits an instruction of transmission of non-request packets with respect to the non-request-packet transmitting unit 33.

The mechanism of the layer 2 loop detecting unit 32 detecting that a layer 2 loop occurs when the number of response packets having the same transmission-source address is larger than the number of request packets is explained. As described above, as a behavior characteristic to a layer 2 loop, the whole area of broadcast domain (a network identified by a network address) is flooded with a large number of broadcast packets. When the flooded broadcast packets are request packets (for example, a Ping request or an SNMP request), the device such as the relay device that receives request packets transmits response packets to the transmission-source address contained in the request packets (that is, an IP address of the layer 2 loop detecting device 10).

Then, when the transmission-source address contained in the request packets is an IP address in a network except the network in which a layer 2 loop occurs, a device such as the relay device transmits a large number of response packets through the layer 3 relay device outside the network. However, in the network where a layer 2 loop occurs, each relay device often falsely learns a MAC address of the layer 3 relay device in the direction where a loop exists, though all the devices in the network where a layer 2 loop occurs respond request packets, response packets may be not transmitted outside the network. On the other hand, response packets from the layer 3 relay device itself are not subject to effects on the falsely learned MAC address and are thereby transmitted outside the network. In other words, when the number of response packets from the layer 3 relay device is at least larger than the number of request packets, the layer 2 loop detecting unit 32 can detect that a layer 2 loop occurs.

For example, when the request-packet transmitting unit 31 transmits 10, Ping requests to the network to be detected of "172. 16. 1.0", the layer 2 loop detecting unit 32 is expected to receive the number of devices 10 response packets even in a regular network. It is understandable that the number of devices may be uncertain, therefore, the layer 2 loop detecting unit 32 of the first embodiment determines whether the number of response packets having an IP address of the layer 3 relay device as a transmission-source address is larger than the number of request packets and detects that a layer 2 loop occurs when the number of response packets having an IP address of layer 3 relay device as a transmission-source address is larger than 10 such as 11, 1000, or the like.

The non-request-packet transmitting unit 33 transmits non-request packets that do not require a response. More specifically, when the layer 2 loop detecting unit 32 detects that a layer 2 loop occurs, the non-request-packet transmitting unit 33 receives an instruction of transmitting non-request packets from the layer 2 loop detecting unit 32 and transmits a large number of non-request packets that are directed to a non-unicast address and that do not require a response through the layer 3 relay device.

That is, when detecting a layer 2 loop, the non-request packets serves a role as "dummy packets". When the non-request-packet transmitting unit 33 transmits a large number of dummy packets such as 1500 bytes of user datagram protocol (UDP) to the network in which a layer 2 loop occurs, request packets accumulated on a buffer such as the relay device are excluded. As a result, it is possible to converge on enlargement in a range on which a layer 2 loop gives an influence along with detection of a layer 2 loop (outflow of a large number of response packets through the layer 3 relay device to another network).

Figure 6:
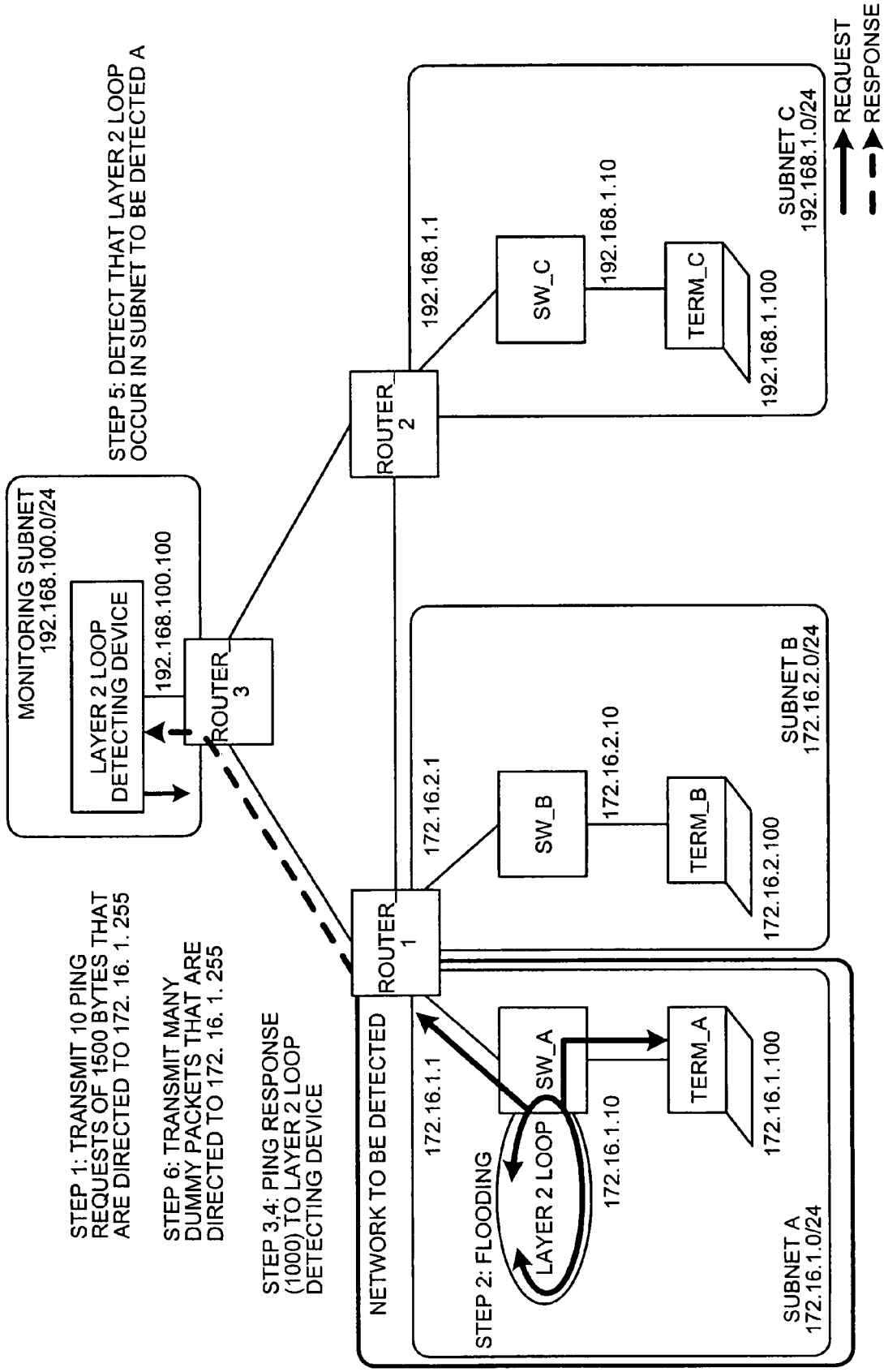
FIG. 6 is a schematic for explaining detection of a layer 2 loop according to the first embodiment.

As shown in FIG. 6, the network according to the first embodiment is constituted of three layer 3 relay devices (a Router_1, a Router_2, and a Router_3) that are connected with one another. In the Router_1, the network identified by a network address of "172. 16. 1. 0/24" is referred to as "a subnet A" and the network identified by a network address of "172. 16. 2. 0/24" is referred to as "a subnet B". In the Router_1, "the subnet A" is connected to under an interface to which "172. 16. 1. 1" is endowed and "the subnet B" is connected to under an interface to which "172. 16. 2. 1" is endowed. On the other hand, in the Router_2 the network identified by a network address of "192. 168. 1. 0/24" is referred to as "a subnet C". In the Router_2, "the subnet C" is connected to under an interface to which "192. 168. 1. 1" is endowed.

In "the subnet A", a relay device (SW_A) identified by "172. 16. 1. 10" and a terminal (Term_A) that is connected to the relay device (SW_A) and that is identified by "172. 16. 1. 100" are connected to each other. Likewise, in "the subnet B", a relay device (SW_B) identified by "172. 16. 2. 10" and a terminal (Term_B) that is connected to the relay device (SW_B) and that is identified by "172. 16. 2. 100" are connected to each other. Likewise, in "the subnet C", a relay device (SW_C) identified by "192. 168. 1. 10" and a terminal (Term_C) that is connected to the relay device (SW_C) and that is identified by "192. 168. 1. 100" are connected to each other.

In the Router_3, a network identified by a network address of "192. 168. 100. 0/24" is referred to as "a monitoring subnet". In the Router_3, "the monitoring subnet" is connected to under an interface to which "192. 168. 100. 100" is endowed. The layer 2 loop detecting device 10 according to the first embodiment is connected to "the monitoring subnet".

"The monitoring subnet" is a network identified by a network address different from the network address that identifies "the subnet A", "the subnet B", and "the subnet C". According to the first embodiment, as shown in FIG. 6, it is assumed that a layer 2 loop occurs in "the subnet A".

Under this configuration the layer 2 loop detecting device 10 according to the first embodiment selects "the subnet A" as the network to be detected. The request-packet transmitting unit 31 of the layer 2 loop detecting device 10 first transmits 10 Ping requests (a packet length of 1500 bytes) that are directed to a broadcast address of "172. 16. 1. 255" that the network to be detected can receive through the Router_1 with respect to the network to be detected including "the subnet A" identified by the network address of "172. 16. 1. 0/24" ("the subnet A" and the network to be detected are the same network according to the first embodiment) (see Step 1).

The Ping requests transmitted from the layer 2 loop detecting device 10 are amplified due to a layer 2 loop that occurs in the relay device (SW_A) connected to "the subnet A" under the Router_1 and the whole area of "the subnet A" is flooded with the Ping requests (see Step 2).

The Router_1, the relay-device (SW_A), and the terminal (Term_A) transmit one response packet with respect to one flooded Ping request to the address "192. 168. 100. 100" of the layer 2 loop detecting device 10 that is a transmission-source address of Ping requests (see Step 3).

All of the Router_1, the relay device (SW_A), and the terminal (Term_A) respond flooded request packets. However, in "the subnet A" where a layer 2 loop occurs the relay device (SW_A) often falsely learns MAC address of the Router_1 in the direction of loop existing and thereby the response packets may not be transmitted outside "the subnet A". On the other hand, response packets from the Router_1 itself are not subject to effects on false learning of MAC address and they are transmitted to outside "the subnet A". Accordingly, the Ping response from the Router_1 (for example, 1000 responses) is transmitted to the layer 2 loop detecting device 10 (see Step 4).

Then, the layer 2 loop detecting unit 32 of the layer 2 loop detecting device 10 receives Ping responses corresponding to Ping requests, employs the number of the received Ping responses and the number of Ping requests, and detects "a condition of occurrence of a layer 2 loop" in the network to be detected. In other words, the layer 2 loop detecting device 10 detects that a layer 2 loop occurs in "the subnet A" as "a condition of occurrence of a layer 2 loop" when 1000 Ping responses that have the transmission-source address of "172. 16. 1. 1" in the Router_1 is larger than 10 Ping requests (see Step 5).

The non-request-packet transmitting unit 33 of the layer 2 loop detecting device 10 transmits non-request packets that do not request a response and that are directed to the broadcast address of "172. 16. 1. 255" and that numbers enough to converges on reception of response packets (a large number) (for example, dummy packets such as UDP packets of 1500 bytes) and removes Ping requests that keep looping, thereby removing Ping responses that keep flowing outside "the subnet A" (see Step 6).

Figure 7:
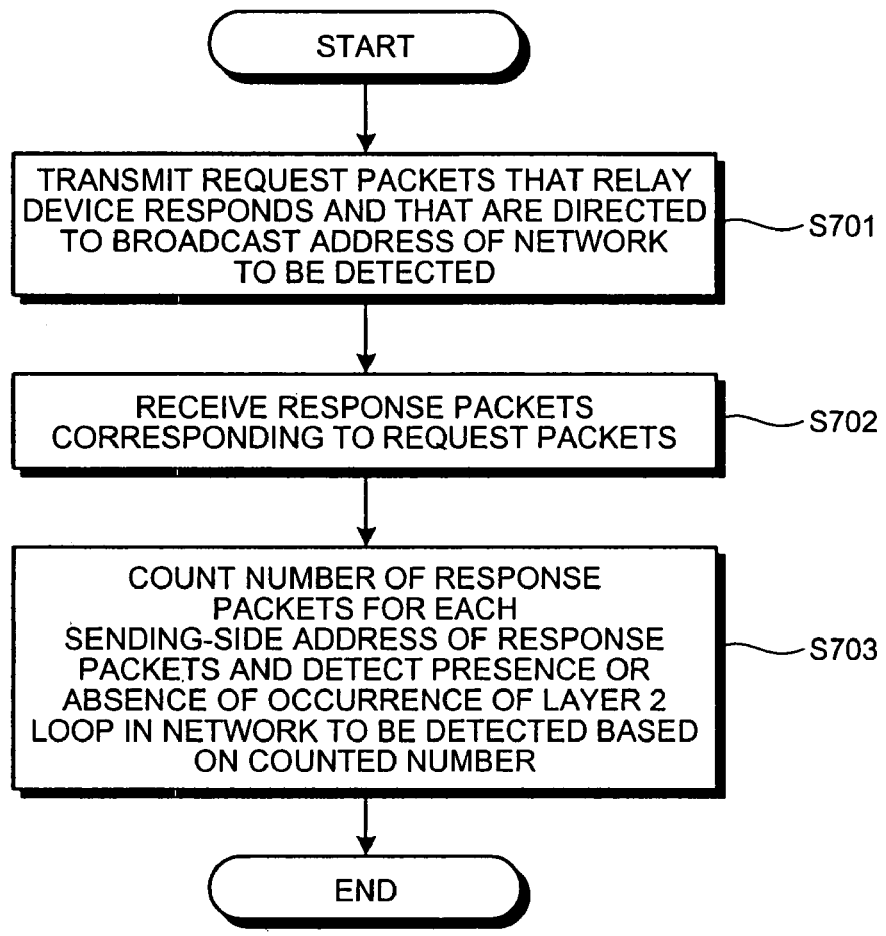
FIG. 7 is a flowchart of a process of detecting a layer 2 loop according to the first embodiment.

FIG. 7 is a flowchart of a process of detecting a layer 2 loop according to the first embodiment.

The request-packet transmitting unit 31 of the layer 2 loop detecting device 10 according to the first embodiment transmits request packets (request packets that the relay device responses) that have a broadcast address as a destination address that the network to be detected can receive with respect to the network to be detected (Step S701).

The layer 2 loop detecting unit 32 of the layer 2 loop detecting device 10 receives (capture) response packets corresponding to request packets (step S702).

The layer 2 loop detecting unit 32 of the layer 2 loop detecting device 10 counts the number of response packets that have the same transmission-source address and detects the presence or absence of occurrence of a layer 2 loop in the network to be detected based on the counted number (step S703).

As a result, the layer 2 loop detecting device according to the first embodiment can detect a layer 2 loop that occurs in a network different from the network that is connected to the detecting device (a network having a different network address, for example, a different subnet and the like).

As described above, according to the first embodiment, the layer 2 loop detecting device detects whether a layer 2 loop occurs in the network identified by a predetermined network address divided by the layer 3 relay device that relays packets at layer 3. The layer 2 loop detecting device transmits a predetermined number of request packets, through the layer 3 relay device, that are directed to a non-unicast address that the network to be detected can receive with respect to the network to be detected including the monitoring network identified by a network address different from the predetermined network address and the network identified by the predetermined network address, receives response packets corresponding to the transmitted request packets through the layer 3 relay device, and detects a condition of occurrence of a layer 2 loop in the network to be detected by employing the number of received response packets and the predetermined number. Therefore, it is possible to detect a layer 2 loop that occurs in a network different from the network that is connected to the detecting device (a network having a different network address, for example, a different subnet and the like).

The layer 2 loop detecting device according to the present invention can detect a layer 2 loop at low cost because it is unnecessary to expend efforts to the existing relay device, compared with a conventional method that needs to make the existing relay device correspond to the STP and a conventional method that needs to replace the existing relay device with a relay device that has a capability of preventing occurrence of a layer 2 loop. The layer 2 loop detecting device according to the present invention can detect a layer 2 loop at low cost, compared with a conventional method in which the detecting device is connected to all of the networks, because it is unnecessary to connect the detecting device to all of the networks (each of the networks having a different network address). Moreover, the layer 2 loop detecting device according to the present invention can early detect a layer 2 loop at remote sites because a network manager does not need to reach the network in which occurrence of a layer 2 loop is suspected (a suspected network), compared with a method that a network manager reaches a suspected network and connects the detecting device to the suspected network.

The layer 2 loop detecting device according to the first embodiment detects that a layer 2 loop occurs as a condition of occurrence of a layer 2 loop when the number of response packets having the same transmission-source address among the received response packets is larger than the number of request packets. Therefore, compared with a method of not employing a transmission-source address contained in the response packets, if the number of the devices that are connected to the network to be detected is uncertain, it is possible to precisely detect that a layer. 2 loop occurs.

The layer 2 loop detecting device according to the first embodiment transmits, when detecting that a layer 2 loop occurs, the predetermined number of non-request packets that are directed to a non-unicast address and that do not require a response through the layer 3 relay device. This makes it possible to converge on enlargement of a range upon which a layer 2 loop exerts an influence along with detection of a layer 2 loop (a large number of response packets flow through the layer 3 relay device to another network).

The layer 2 loop detecting device according to the first embodiment specifies a packet length of request packets to a predetermined packet length to transmit them. This makes it possible to reduce an increased load of the device along with detection of a layer 2 loop (an increased load by adding a load of processing request packets transmitted from the layer 2 loop detecting device). That is, a load of the device that processes packets is proportional to the number of transmitting and receiving packets per hour and thereby it is possible to reduce an increased load of the device, for example, by specifying a predetermined packet length to a long size of 1500 bytes and the like.

So far an explanation is given about the example that, as the first embodiment, the layer 2 loop detecting device performs detection of a layer 2 loop serving a subnetwork in which a layer 2 loop occurs as the network to be detected and detects that "a layer 2 loop occurs" as "a condition of occurrence of a layer 2 loop", however, the present invention is not limited to the example. The present invention can be also applied to an example that the layer 2 loop detecting device performs detection of a layer 2 loop serving a subnetwork in which a layer 2 loop does not occur as the network to be detected and detects that "a layer 2 loop does not occur" as "a condition of occurrence of a layer 2 loop" (an example of detecting that "a layer 2 loop does not occur"). Then, the example that the layer 2 loop detecting device detects that "a layer 2 loop does not occur" is below explained as a second embodiment of the present invention.

Figure 8:
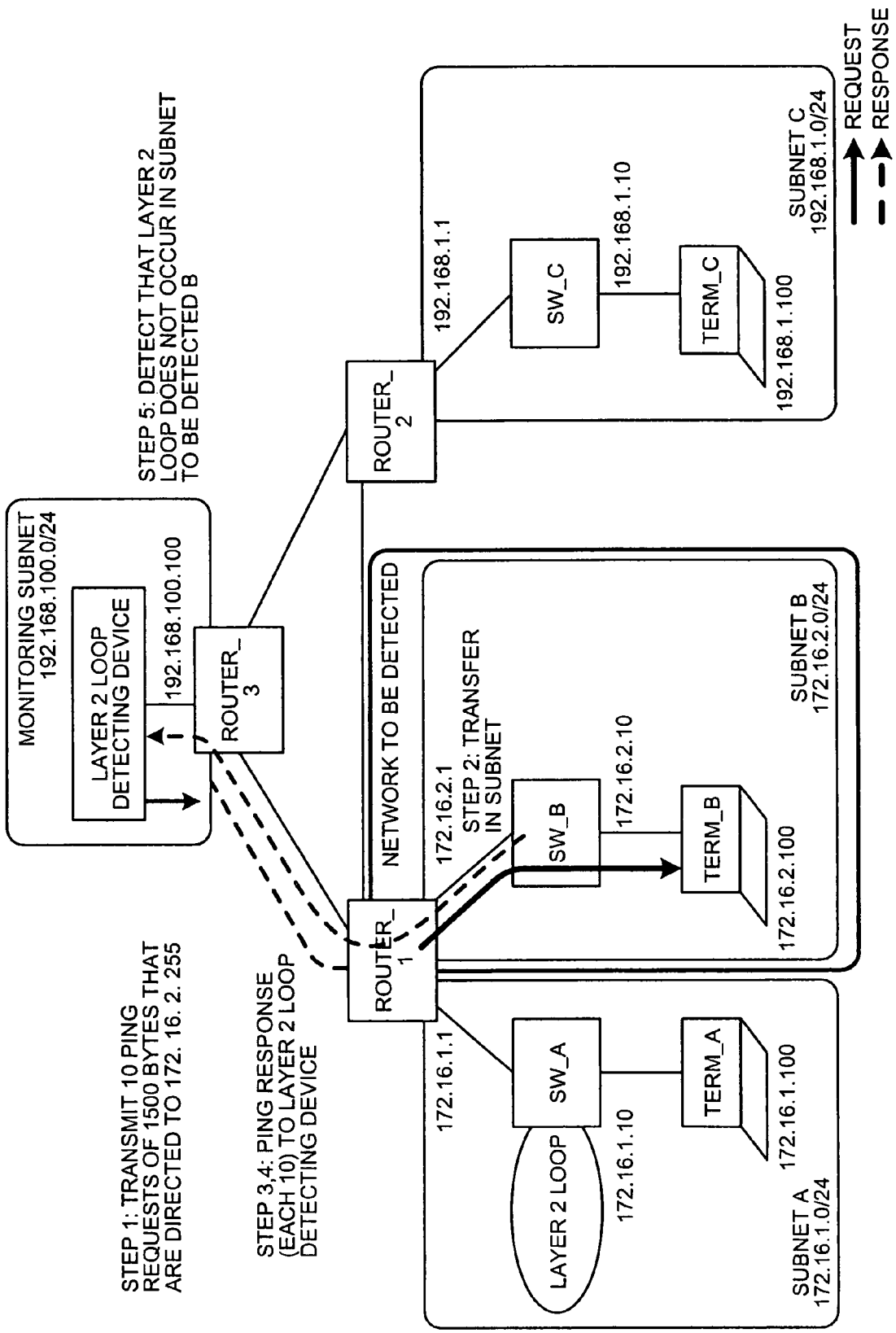
FIG. 8 is a schematic for explaining detection of a layer 2 loop according to a second embodiment of the present invention.

Detection of a layer 2 loop according to the second embodiment is explained with specific examples. With regard to a configuration of the network, the network according to the second embodiment, as shown in FIG. 8, has the same configuration as in the first embodiment and the explanation is omitted.

The layer 2 loop detecting device 10 according to the second embodiment selects "the subnet B" as the network to be detected. The request-packet transmitting unit 31 of the layer 2 loop detecting device 10 first transmits 10 Ping requests (a packet length of 1500 bytes) that are directed to a broadcast address "172. 16. 2. 255" that the network to be detected can receive through the Router_1 with respect to the network to be detected including "the subnet B" identified by the network address "172. 16. 2. 0/24" ("the subnet B" and the network to be detected are the same network according to the second embodiment) (see Step 1).

The Ping requests transmitted from the layer 2 loop detecting device 10 are transferred to "the subnet B" under the Router_1 (see Step 2).

The Router_1, the relay device (SW_B), and the terminal (Term_B) transmit one response packet with respect to one transferred request packet to the address of "192. 168. 100. 100" of the layer 2 loop detecting device 10 that is a transmission-source address of Ping requests (see Step 3).

All of the Router_1, the relay device (SW_B), and the terminal (Term_B) respond to the transferred request packets and thereby a Ping response of the Router_1 (for example, 10 responses) is transmitted to the layer 2 loop detecting device 10 (see Step 4).

Then, the layer 2 loop detecting unit 32 of the layer 2 loop detecting device 10 detects that a layer 2 loop does not occur in "the subnet B" as "a condition of occurrence of a layer 2 loop" when 10 Ping responses whose transmission-source address is the address of "172. 16. 2. 1" of the Router_1 are the same as 10 Ping requests (see Step 5).

As described above, the layer 2 loop detecting device according to the second embodiment detects that a layer 2 loop does not occur as a condition of occurrence of a layer 2 loop, when the number of response packets having the same transmission-source address among the received response packets is equal to or less than a predetermined number. Compared with a method of not employing a transmission-source address contained in response packets, if the number of the devices connected to the network to be detected is uncertain, it is possible to precisely detect that a layer 2 loop does not occur.

So far, examples that the layer 2 loop detecting device detects a layer 2 loop, serving one subnetwork identified by a predetermined network address as the network to be detected are explained in the first to second embodiments, however, the present invention is not limited to the examples. The present invention can be also applied to an example that the layer 2 loop detecting device detects a layer 2 loop, serving an upper-level network including a plurality of subnetworks identified by a predetermined network address as the network to be detected (an example serving an upper-level network as targeted detection). Therefore, an example that the layer 2 loop detecting device serves the upper-level network as targeted detection is explained below in a third embodiment of the present invention.

Figure 9:
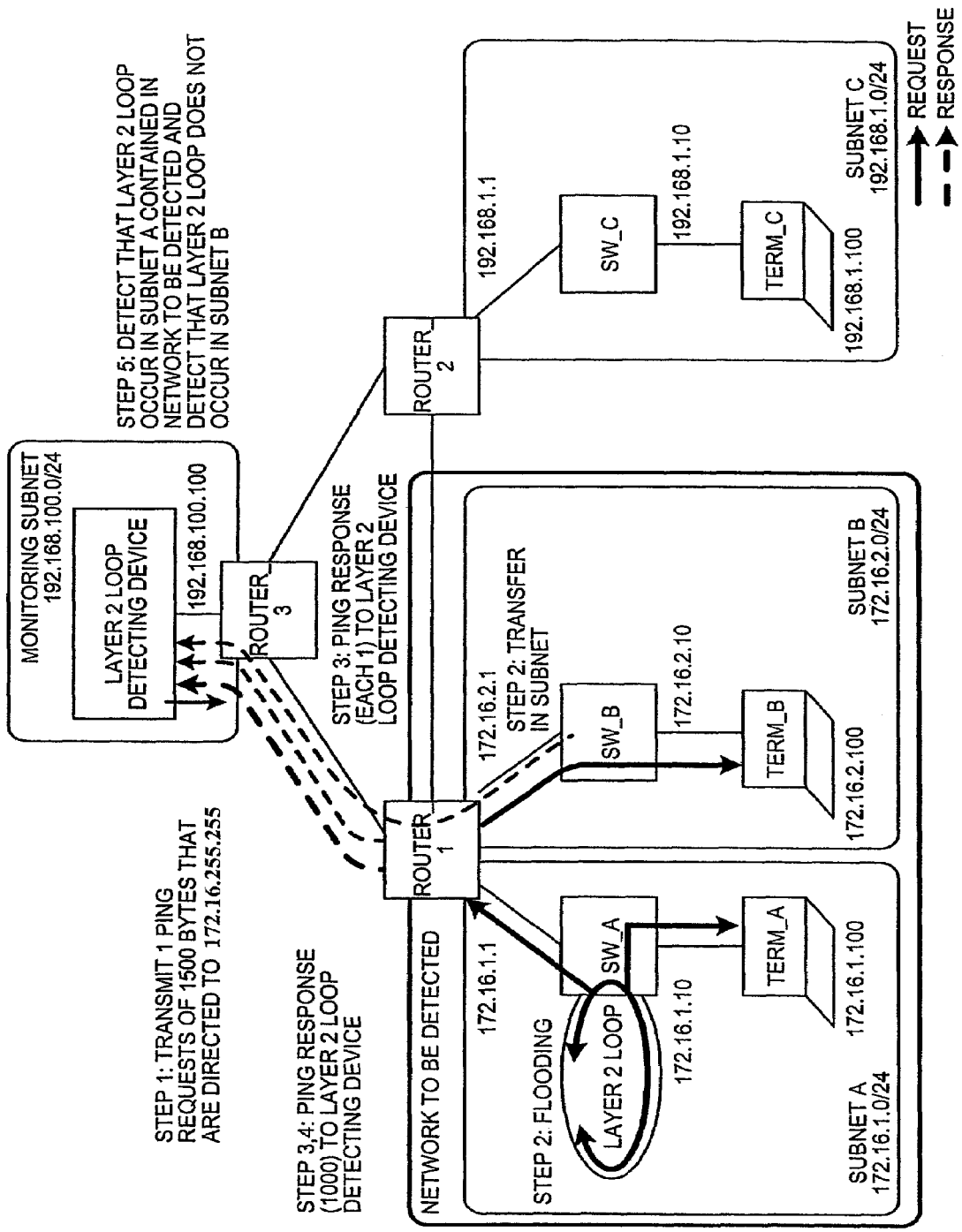
FIG. 9 is a schematic for explaining detection of a layer 2 loop according to a third embodiment of the present invention.

Detection of a layer 2 loop according to the third embodiment is explained with specific examples. A configuration of the network according to the third embodiment, as shown in FIG. 9, has the same configuration as in the first embodiment and the explanation is omitted.

The layer 2 loop detecting device 10 according to the third embodiment selects the upper-level network that includes "the subnet A" and "the subnet B" as the network to be detected. The request-packet transmitting unit 31 of the layer 2 loop detecting device 10 transmits one Ping request (a packet length of 1500 bytes), through the Router_1, that is directed to a broadcast address of "172. 16. 255. 255" that the network to be detected can receive with respect to the upper-level network of "172. 16. 0. 0/16" (the upper-level network is the network to be detected according to the third embodiment) that includes "the subnet A" identified by the network address "172. 16. 1. 0/24" and "the subnet B" identified by the network address of "172. 16. 2. 0/24" (see Step 1).

The Ping request transmitted from the layer 2 loop detecting device 10 is amplified due to a layer 2 loop that occurs at the relay device (SW_A) connected to "the subnet A" under the Router_1 and the whole area of "the subnet A" is flooded with the amplified Ping request. The Ping request is transferred to "the subnet B" under the Router_1 (see Step 2).

In the same way as in the first embodiment, the Router_1 (an interface of "172. 16. 1. 1"), the relay device (SW_A), and the terminal (Term_A) transmit one response packet with respect to one flooded Ping request to the address of the layer 2 loop detecting device 10 of "192. 168. 100. 100" that is the transmission-source address of the Ping request. In the same way as in the second embodiment, the Router_1 (an interface of "172. 16. 2. 1"), the relay device (SW_B), and the terminal (Term_B) transmit one response packet with respect to one request packet that is transferred to the address of the layer 2 loop detecting device 10 of "192. 168. 100. 100" that is the transmission-source address of the Ping request (see Step 3).

In the same way as in the first embodiment, the response packets from the Router_1 (an interface of "172. 16. 1. 1") is transmitted outside "the subnet A" because the response packets are not subject to effects on false learning of MAC address. Thus, the Ping response from the Router_1 (an interface of "172. 16. 1. 1") (for example, 1000 responses) is transmitted to the layer 2 loop detecting device 10. In addition, in the same way as in the second embodiment, all of the Router_1 (an interface of "172. 16. 2. 1"), the relay device (SW_B), and the terminal (Term_B) respond the request packets that are transferred. Thus, the Ping response from the Router_1 (an interface of "172. 16. 2. 1") (for example, one response) is transmitted to the layer 2 loop detecting device 10 (see Step 4).

Then, the layer 2 loop detecting unit 32 of the layer 2 loop detecting device 10 receives the Ping response corresponding to the Ping request in the same way as in the first embodiment and, when 1000 Ping responses whose transmission-source address is the address of "172. 16. 1. 1" of the Router_1 are larger than one Ping request, detects that a layer 2 loop occurs in "the subnet A" as "a condition of occurrence of a layer 2 loop". The layer 2 loop detecting unit 32, in the same way as in the second embodiment, detects that a layer 2 loop does not occur in "the subnet B" as "a condition of occurrence of a layer 2 loop" when one Ping response whose transmission-source address is the address of "172. 16. 2. 1" of the Router_1 is the same as one Ping request (see Step 5).

As described above, according to the third embodiment, the network to be detected is the upper-level network that includes a plurality of subnetworks identified by a predetermined network address respectively. The layer 2 loop detecting device transmits request packets that are directed to a broadcast address corresponding to the upper-level network as a non-unicast address to the upper-level network, receives response packets corresponding to request packets from the subnetworks respectively, employs the number of response packets that have the same transmission-source address among the received response packets and the number of request packets, and detects a condition of occurrence of a layer 2 loop in the subnetworks identified based on the transmission-source address. This makes it possible to specify a subnetwork to which a layer 2 loop that occurs in the subnetwork belongs by only transmitting the request packets to the upper-level network and to detect a layer 2 loop. It is also possible to monitor the plurality of subnetworks at the same time.

So far, examples that the layer 2 loop detecting device serves one subnetwork as the network to be detected and that the layer 2 loop detecting device serves the upper-level network as the network to be detected are explained in the first to third embodiments, however, the present invention is not limited to the examples. The present invention can be also applied to the example that the layer 2 loop detecting device serves a multicast network that includes a subnetwork (or a network) connected to a device registered in a predetermined multicast address as the network to be detected (an example of serving the multicast network as targeted detection). The example that the layer 2 loop detecting device serves the multicast network as targeted detection is explained below in a fourth embodiment of the present invention.

Figure 10:
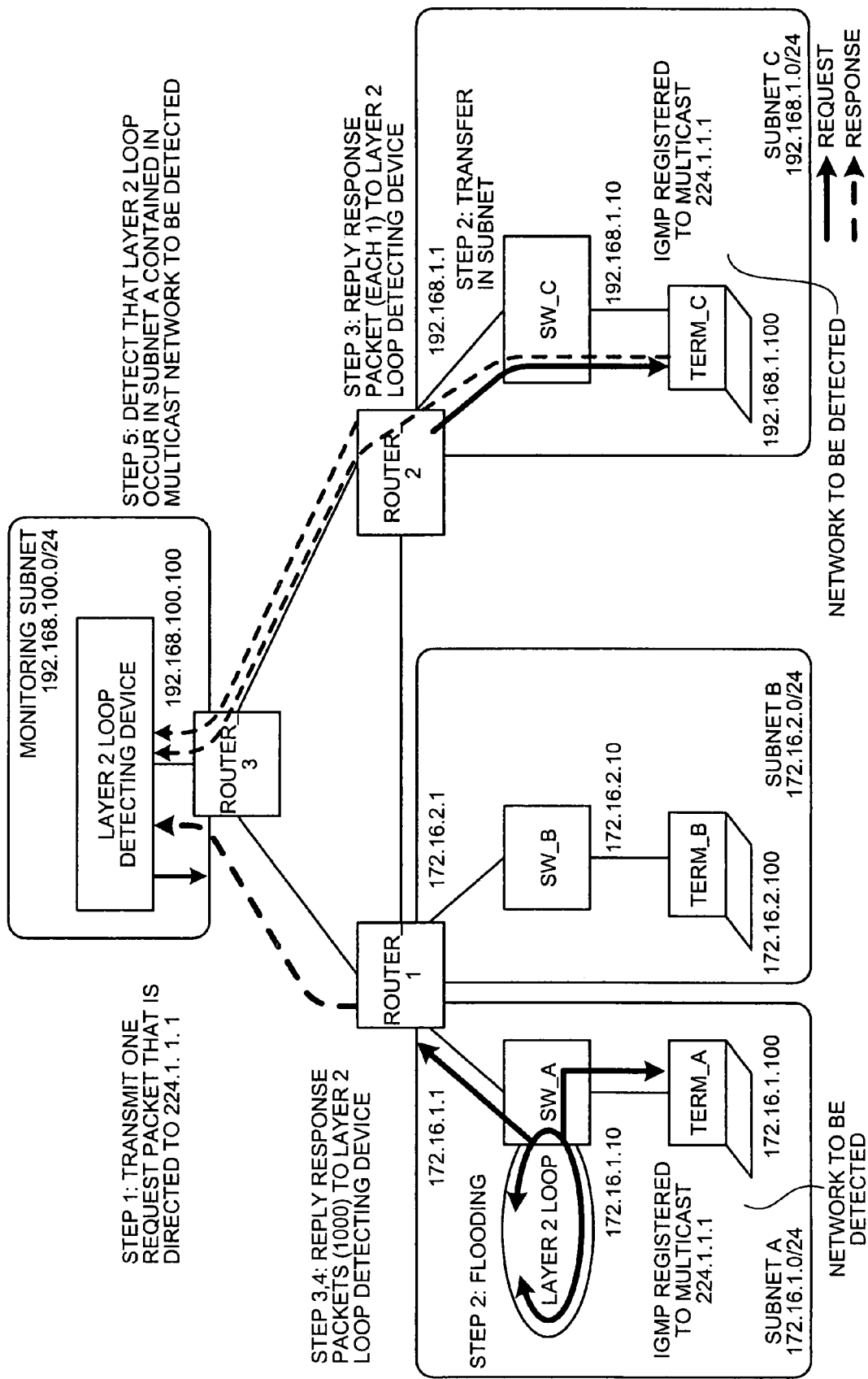
FIG. 10 is a schematic for explaining detection of a layer 2 loop according to a fourth embodiment of the present invention.

An explanation is given about detection of a layer 2 loop according to the fourth embodiment with specific examples. First of all, a configuration of the network of the fourth embodiment, as shown in FIG. 10, is almost the same as in the first embodiment except that the terminal (Term_A) that is connected to "the subnet A" and is identified by "172. 16. 1. 100", and the terminal (Term_C) that is connected to "the subnet C" and is identified by "192. 168. 1. 100", are registered in the multicast address of "224. 1. 1. 1".

Under this configuration, the layer 2 loop detecting device 10 according to the fourth embodiment selects "the multicast network (224. 1. 1. 1)" as the network to be detected. The request-packet transmitting unit 31 of the layer 2 loop detecting device 10 transmits one Ping request, through the Router_1 and the Router_2, that is directed to the multicast address of "224. 1. 1. 1" that the network to be detected can receive with respect to the multicast network that includes "the subnet A" identified by the network address of "172. 16. 1. 0/24", and "the subnet C" identified by the network address "192. 168. 1. 0/24", (the multicast network is the network to be detected according to the fourth embodiment) (see Step 1).

The Ping request transmitted from the layer 2 loop detecting device 10 is amplified due to a layer 2 loop that occurs in the relay device (SW_A) connected to "the subnet A" under the Router_1 and the whole area of "the subnet A" is flooded with the amplified Ping request. The Ping request is transferred to "the subnet C" under the Router_2 (see Step 2).

The Router_1 (an interface of "172. 16. 1. 1") and the terminal (Term_A) transmit one response packet with respect to one flooded Ping request to the address of the layer 2 loop detecting device 10 of "192. 168. 100. 100" that is the transmission-source address of the Ping request. The Router_2 (an interface of "192. 168. 1. 1") and the terminal (Term_C) transmit one response packet with respect to one request packet that is transferred to the address of the layer 2 loop detecting device 10 of "192. 168. 100. 100" that is the transmission-source address of the Ping request (see Step 3).

In the same way as in the first embodiment, the response packets from the Router_1 (an interface of "172. 16. 1. 1") is transmitted outside "the subnet A" because the response packets are not subject to effects on false learning of MAC address. Thus, the Ping response (for example, 1000 responses) from the Router_1 (an interface of "172. 16. 1. 1") is transmitted to the layer 2 loop detecting device 10. In addition, the Router_2 (an interface of "192. 168. 1. 1") and the terminal (Term_C) respond the request packets that are transferred. Thus, the Ping response (for example, one response) from the Router_2 (an interface of "192. 168. 1. 1") is transmitted to the layer 2 loop detecting device 10 (see Step 4).

Then, the layer 2 loop detecting unit 32 of the layer 2 loop detecting device 10 receives the Ping response corresponding to the Ping request in the same way as in the first embodiment and, when 1000 Ping responses whose transmission-source address is the address of "172. 16. 1. 1" of the Router_1 are larger than one Ping request, detects that a layer 2 loop occurs in "the subnet A" as "a condition of occurrence of a layer 2 loop". The layer 2 loop detecting unit 32 detects that a layer 2 loop does not occur in "the subnet C" as "a condition of occurrence of a layer 2 loop" when one Ping response whose transmission-source addressees the address of "192. 168. 1. 1" of the Router_2 is the same in number as one Ping request (see Step 5).

As described above, according to the fourth embodiment, the network to be detected is the multicast network that includes the network identified by a predetermined network address that is connected to the device registered to a predetermined multicast address. The layer 2 loop detecting device transmits request packets that are directed to the multicast address as a non-unicast address to the multicast network, receives response packets corresponding to request packets from the network, employs the number of response packets that have the same transmission-source address among the received response packets and the number of request packets, and detects a condition of occurrence of a layer 2 loop in the network discriminated based on the transmission-source address. This makes it possible to specify a subnetwork to which a layer 2 loop that occurs in a subnetwork contained in the multicast network belongs by only transmitting the request packets to the multicast network and to detect the layer 2 loop.

So far, examples that the layer 2 loop detecting device performs one layer 2 loop detection are explained in the first to fourth embodiments, however, the present invention is not limited to the examples. The present invention can be also applied to the example that the layer 2 loop detecting device periodically performs layer 2 loop detection (an example of monitoring all the time). Therefore, an example that the layer 2 loop detecting device always monitors layer 2 loop detection is below explained as a fifth embodiment of the present invention.

Figure 11:
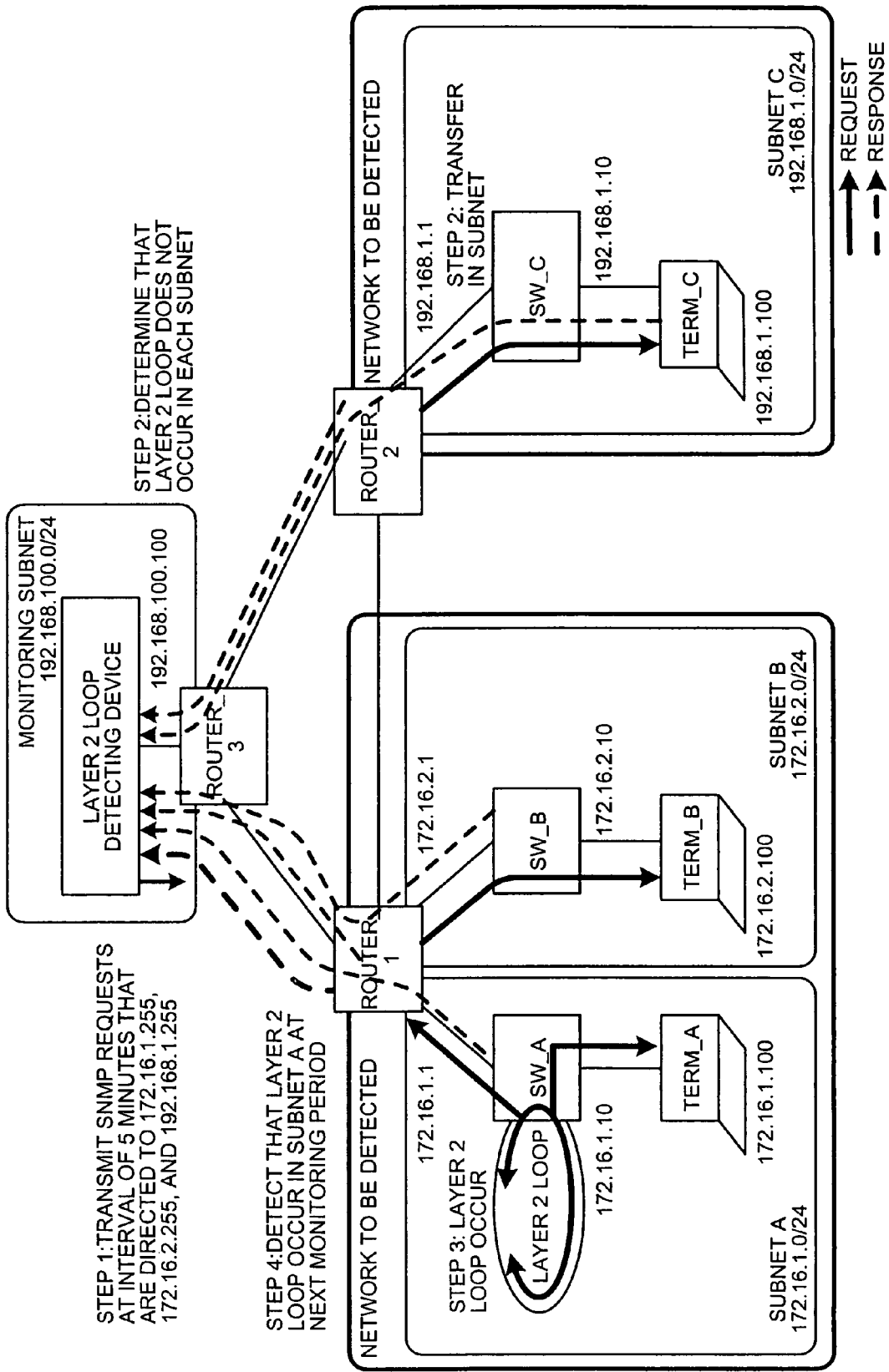
FIG. 11 is a schematic for explaining detection of a layer 2 loop according to a fifth embodiment of the present invention.

An explanation is given about detection of a layer 2 loop according to the fifth embodiment with specific examples. A configuration of the network of the fifth embodiment, as shown in FIG. 11, is almost the same as in the first embodiment. It is assumed according to the fifth embodiment that a layer 2 loop has not occurred yet in "the subnet A".

The layer 2 loop detecting device 10 according to the fifth embodiment selects "the subnet A", "the subnet B", and "the subnet C" as the network to be detected. The request-packet transmitting unit 31 of the layer 2 loop detecting device 10 repeatedly transmits an SNMP request, at a certain period (for example, an interval of 5 minutes), that is directed to broadcast addresses of "172. 16. 1. 255", "172. 16. 2. 255", and "192. 168. 1. 255" that the network to be detected can receive with respect to the network to be detected that includes "the subnet A" identified by the network address of "172. 16. 1. 0/24", "the subnet B" identified by the network address of "172. 16. 2. 0/24", and "the subnet C" identified by the network address of "192. 168. 1. 0/24" (see Step 1).

Because a layer 2 loop has not occurred yet in "the subnet A", the SNMP request transmitted from the layer 2 loop detecting device 10 is transferred to "the subnet A" under the Router_1, "the subnet B" under the Router_1, and "the subnet C" under the Router_2. The SNMP responses in the Router_1 (an interface of "172. 16. 1. 1" and an interface of "172. 16. 2. 1") and in the Router_2 (an interface of "192. 168. 1. 1") are transmitted to the layer 2 loop detecting device 10. The layer 2 loop detecting unit 32 of the layer 2 loop detecting device 10 detects that a layer 2 loop does not occur in "the subnet A", "the subnet B", and "the subnet C" as "a condition of occurrence of a layer 2 loop" when the number of SNMP responses is equal to or less than the number of SNMP requests in the same way as in the above embodiments (see Step 2).

It is assumed that a layer 2 loop occurs in "the subset A" (see Step 3). Then, as described at Step 1, the request-packet transmitting unit 31 of the layer 2 loop detecting device 10 according to the fifth embodiment repeatedly transmits the SNMP request, at a certain period (for example, an interval of 5 minutes), with respect to the network to be detected that includes "the subnet A", "the subnet B", and "the subnet C". Therefore, the SNMP request transmitted from the layer 2 loop detecting device 10 is amplified due to a layer 2 loop that occurs in the relay device (SW_A) connected to "the subnet A" under the Router_1 and the whole area of "the subnet A" is flooded with the amplified SNMP request.

The SNMP response of the Router_1 (an interface of "172.16.1.1") is transmitted to the layer 2 loop detecting device 10 and the layer 2 loop detecting unit 32 of the layer 2 loop detecting device 10 detects that a layer 2 loop occurs in "the subnet A" as "a condition of occurrence of a layer 2 loop", in the same way as in the embodiments, when the number of SNMP responses is larger than the number of SNMP requests (see Step 4).

As described above, according to the fifth embodiment, the layer 2 loop detecting device repeatedly transmits request packets at a predetermined period, repeatedly receives, at a predetermined period, response packets corresponding to request packets repeatedly transmitted at the predetermined period, and detects how a layer 2 loop occurs at a determined period. This makes it possible to always monitor how a layer 2 loop occurs and early detect a layer 2 loop.

Furthermore, according to the fifth embodiment, the network to be detected includes one or more subnetworks identified by a predetermined network address respectively. The layer 2 loop detecting device transmits request packets that are directed to a broadcast address corresponding to the predetermined network address as a non-unicast address to the subnetworks respectively, receives response packets corresponding to request packets from the subnetworks, employs the number of response packets that have the same transmission-source address among the received response packets and the number of request packets, and detects how a layer 2 loop occurs in the subnetwork identified based on the transmission-source address. This makes it possible to specify which subnetwork a layer 2 loop that occurs in one or more subnetworks belongs to and detect the layer 2 loop.

So far, examples that the layer 2 loop detecting device performs layer 2 loop detection, serving all the networks to be to be detected as the network to be detected are explained in the first to fifth embodiments, however, the present invention is not limited to the examples. The present invention can be also applied to the example that the layer 2 loop detecting device detects a suspected network from the networks to be to be detected and detects a layer 2 loop, serving the suspected network as the network to be detected (an example of serving the suspected network as targeted detection). Therefore, the example that the layer 2 loop detecting device serves the suspected network as targeted detection is below explained as a sixth embodiment of the present invention.

Figure 12:
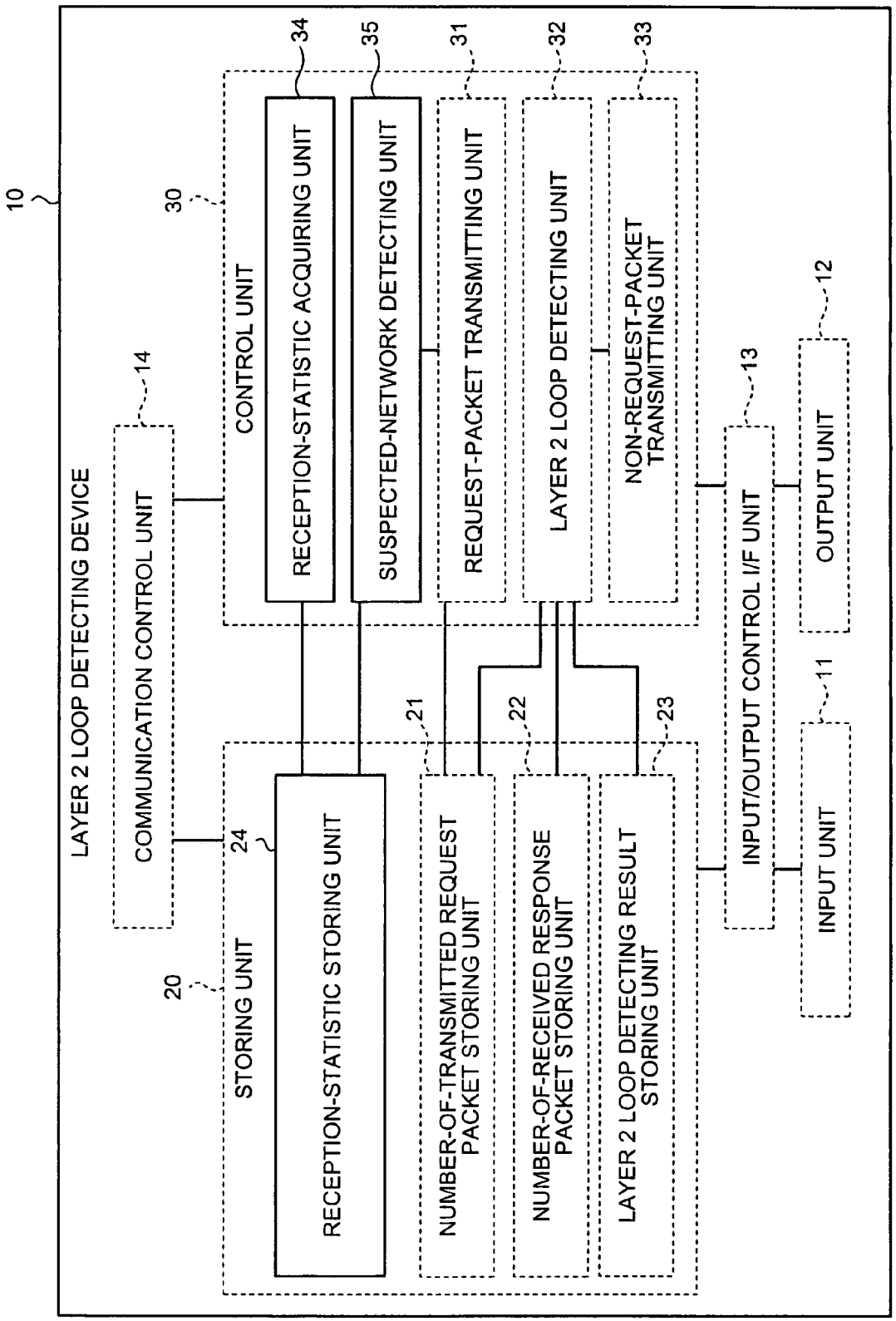
FIG. 12 is a block diagram for explaining a configuration of the layer 2 loop detecting device according to a sixth embodiment of the present invention.

FIG. 12 is a block diagram for explaining the configuration of the layer 2 loop detecting device 10 according to the sixth embodiment.

As shown in FIG. 12, the layer 2 loop detecting device 10 according to the sixth embodiment is different from according to the first embodiment in that the layer 2 loop detecting device 10 includes a reception-statistic storing unit 24, a reception-statistic acquiring unit 34, and a suspected-network detecting unit 35. The reception-statistic storing unit 24, the reception-statistic acquiring unit 34, the suspected-network detecting unit 35 are particularly explained in the following. The reception-statistic acquiring unit 34 corresponds to "a reception-statistic acquiring unit" described in claim and the suspected-network detecting unit 35 corresponds to "a suspected-network detecting unit" described in claim.

The reception-statistic storing unit 24 stores a reception statistic of non-unicast packets accumulated at the layer 3 relay device. More specifically, the reception-statistic storing unit 24 stores the reception statistic acquired by the reception-statistic acquiring unit 34 for each network divided by the layer 3 relay device and the stored reception statistic is used for processing of the suspected-network detecting unit 35.

For example, the reception-statistic storing unit 24 operates the RDBMS program and the like and stores "ifInNUcastPkts MIB", corresponding to an interface, that is a management information base (MIB) for indicating a non-unicast packet reception statistic in each interface of the Router_1 and the Router_2.

The reception-statistic acquiring unit 34 acquires the reception statistic of non-unicast packets accumulated at the layer 3 relay device. More specifically, the reception-statistic acquiring unit 34 repeatedly acquires the reception statistic of non-unicast packets (for example, broadcast packets, multicast packets, and the like) accumulated at the layer 3 relay device at a predetermined period from the layer 3 relay device for each network divided by the layer 3 relay device and makes the reception-statistic storing unit 24 store the acquired reception statistic.

For example, the reception-statistic acquiring unit 34 repeatedly acquires "ifInNUcastPkts MIB" accumulated in each interface of the Router_1 and the Router_2 for each interface at a predetermined period (for example, an interval of one minute).

The suspected-network detecting unit 35 detects a suspected network. More specifically, the suspected-network detecting unit 35 receives the reception statistic acquired by the reception-statistic acquiring unit 34 from the reception-statistic storing unit 24, calculates the quantity of receiving non-unicast packets per an hour based on the reception statistic for each network, detects the network as a suspected network when the calculated quantity of receiving non-unicast packets is larger than a predetermined threshold (for example, 500 pulses per second), and transmits an instruction of transmitting request packets to the request-packet transmitting unit 31.

For example, the suspected-network detecting unit 35 calculates the quantity of receiving non-unicast packets per an hour based on "ifInNUcastPkts MIB" in each interface of the Router_1 and the Router_2 that is received from the reception-statistic storing unit 24 for each interface and detects the network as a suspected network when the calculated quantity of receiving non-unicast packets is larger than the predetermined threshold.

Figure 13:
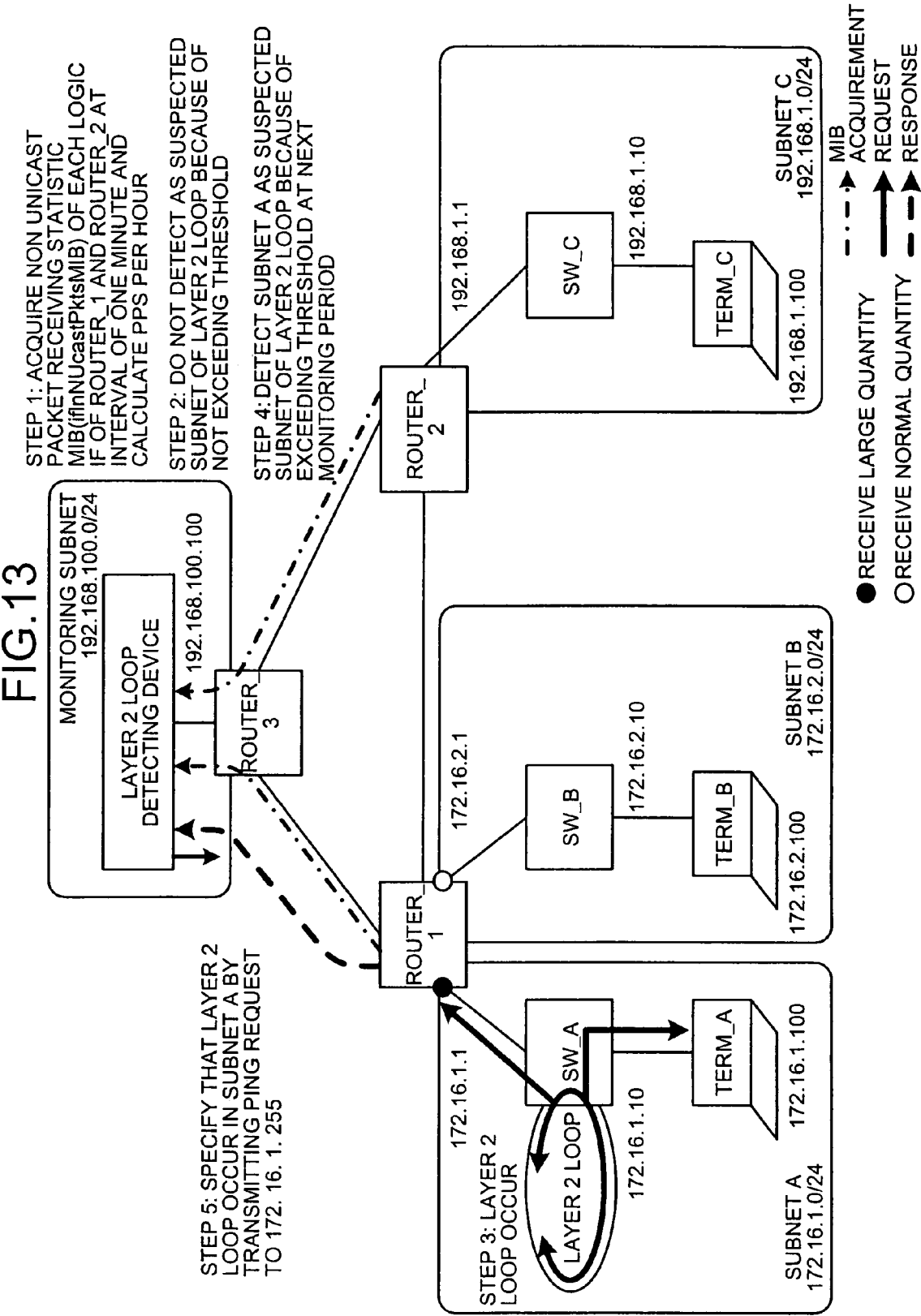
FIG. 13 is a schematic for explaining detection of a layer 2 loop according to the sixth embodiment.

An explanation is given about detection of a layer 2 loop according to the sixth embodiment with specific examples. A configuration of the network of the sixth embodiment, as shown in FIG. 13, is almost the same as in the first embodiment. It is assumed according to the sixth embodiment that a layer 2 loop has not occurred yet in "the subnet A".

The layer 2 loop detecting device 10 according to the sixth embodiment selects "the subnet A", "the subnet B", and "the subnet C" as the network to be detected. The reception-statistic acquiring unit 34 of the layer 2 loop detecting device 10 repeatedly acquires "ifInNUcastPkts MIB" accumulated in each interface of the Router_1 and the Router_2 for each interface at a predetermined period (for example, an interval of one minute). The suspected-network detecting unit 35 of the layer 2 loop detecting device 10 calculates, for each interface, the quantity of receiving non-unicast packets per an hour based on "ifInNUcastPkts MIB" in each interface (see Step 1).

The suspected-network detecting unit 35 of the layer 2 loop detecting device 10 compares whether the quantity of receiving calculated non-unicast packets is larger than the predetermined threshold. Because a layer 2 loop has not occurred yet in "the subnet A", the quantity of receiving calculated non-unicast packets does not exceed the predetermined threshold and the suspected-network detecting unit 35 does not detect a suspected network (see Step 2).

It is assumed that a layer 2 loop occurs in "the subset A" (see Step 3). Then, as described at Step 1, the reception-statistic acquiring unit 34 of the layer 2 loop detecting device 10 according to the sixth embodiment repeatedly acquires "ifInNUcastPkts MIB" for each interface at a certain period (for example, an interval of 1 minute) and the suspected-network detecting unit 35 calculates, for each interface, the quantity of receiving non-unicast packets per an hour based on "ifInNUcastPkts MIB" in each interface. When the suspected-network detecting unit 35 compares whether the quantity of receiving non-unicast packets is larger than the predetermined threshold, the quantity of receiving calculated non-unicast packets in "the subnet A" is larger than the predetermined threshold, thereby the suspected-network detecting unit 35 detects "the subnet A" as a suspected network (see Step 4).

Then, the request-packet transmitting unit 31 of the layer 2 loop detecting device 10 according to the sixth embodiment transmits the Ping request, in the same way as in the first embodiment, which is directed to the broadcast address of "172. 16. 1. 255" to "the subnet A", and the layer 2 loop detecting unit 32 receives Ping response whose transmission-source address is the address of "172. 16. 1. 1" of the Router_1, employs the number of received Ping responses and the number of Ping request, and detects "a condition of occurrence of a layer 2 loop" in the network to be detected (see Step 5).

As described above, the layer 2 loop detecting device of the sixth embodiment repeatedly acquires the reception statistic of non-unicast packets accumulated at the layer 3 relay device from the layer 3 relay device at a predetermined period for each network divided by the layer 3 relay device, calculates the quantity of receiving non-unicast packets per an hour based on the acquired reception statistic for each network, detects the network as a suspected network when the quantity of receiving calculated non-unicast packets is larger than the predetermined threshold, and transmits request packets to the detected suspected network. Thus, a network that has a high possibility that a layer 2 loop occurs (a suspected network) is detected and then request packets are transmitted to the suspected network. It is possible to check a useless traffic such as transmitting request packets to a network in which a layer 2 loop does not occur and efficiently detect a layer 2 loop.

So far, examples that the layer 2 loop detecting device transmits request packets at any given period (or once) are explained in the first to sixth embodiments, however, the present invention is not limited to the examples. The present invention can be also applied to the example that the layer 2 loop detecting device repeatedly transmits request packets at a period of a timeout time or less determined based on a routing protocol. Accordingly, the example that the layer 2 loop detecting device repeatedly transmits request packets at a period of a timeout time or less determined based on a routing protocol is explained below as a seventh embodiment of the present invention.

The seventh embodiment is different from the above embodiments in that the request-packet transmitting unit 31 of the layer 2 loop detecting device 10 repeatedly transmits request packets at a period of a timeout time or less determined based on a routing protocol in the network identified by the predetermined network address.

For example, as shown in FIG. 14, the request-packet transmitting unit 31 transmits request packets at a period of a maximum monitoring period (a timeout time) or less corresponding to a routing protocol in the network by acquiring information that the routing protocol and the maximum monitoring period are associated with each other from the storing unit of the layer 2 loop detecting device or another device and the like.

This transmission is performed for the purpose of avoiding the situation that there is a possibility of request packets not reaching the network to be detected because routing processing left undone due to effects of a layer 2 loop causes the timeout time of the routing protocol to elapse, thereby leading to a situation that a layer 2 loop can not be properly detected. The maximum monitoring period shown in FIG. 14 is an example. A timer (a timeout time) to delete an entry from a routing table is 240 seconds in RIPv 1 (Routing Information Protocol Version 1) by default, 40 seconds in open shortest path first (OSPF), and 15 seconds in enhanced interior gateway routing protocol (EIGRP). The layer 2 loop detecting device 10 associates these information with one another for maintenance.

When the request-packet transmitting unit 31 of the layer 2 loop detecting device 10 according to the seventh embodiment monitors, for example, a network that uses RIPv 1 as a routing protocol, it sets a monitoring period equal to or less than 240 seconds from information shown in FIG. 14 and transmits request packets at the period equal to or less than 240 seconds.

As described above, the layer 2 loop detecting device according to the seventh embodiment repeatedly transmits request packets at the period of a timeout time or less determined based on a routing protocol in the network identified by a predetermined network address. This makes it possible to properly detect a layer 2 loop. In other words, there is a possibility of request packets not reaching the network to be detected because routing processing left undone due to effects of a layer 2 loop causes the timeout time of the routing protocol to elapse, however, for example, the layer 2 loop detecting device repeatedly transmits request packets at a shorter period than the timeout time of the routing protocol, thereby avoids request packets not reaching the network to be detected, and can properly detect a layer 2 loop.

So far, the layer 2 loop detecting device according to the first to seventh embodiments is explained. The present invention may be executed in various aspects except the above embodiments. Thus, another embodiment is below explained as the layer 2 loop detecting device of an eighth embodiment of the present invention.

Figure 15:
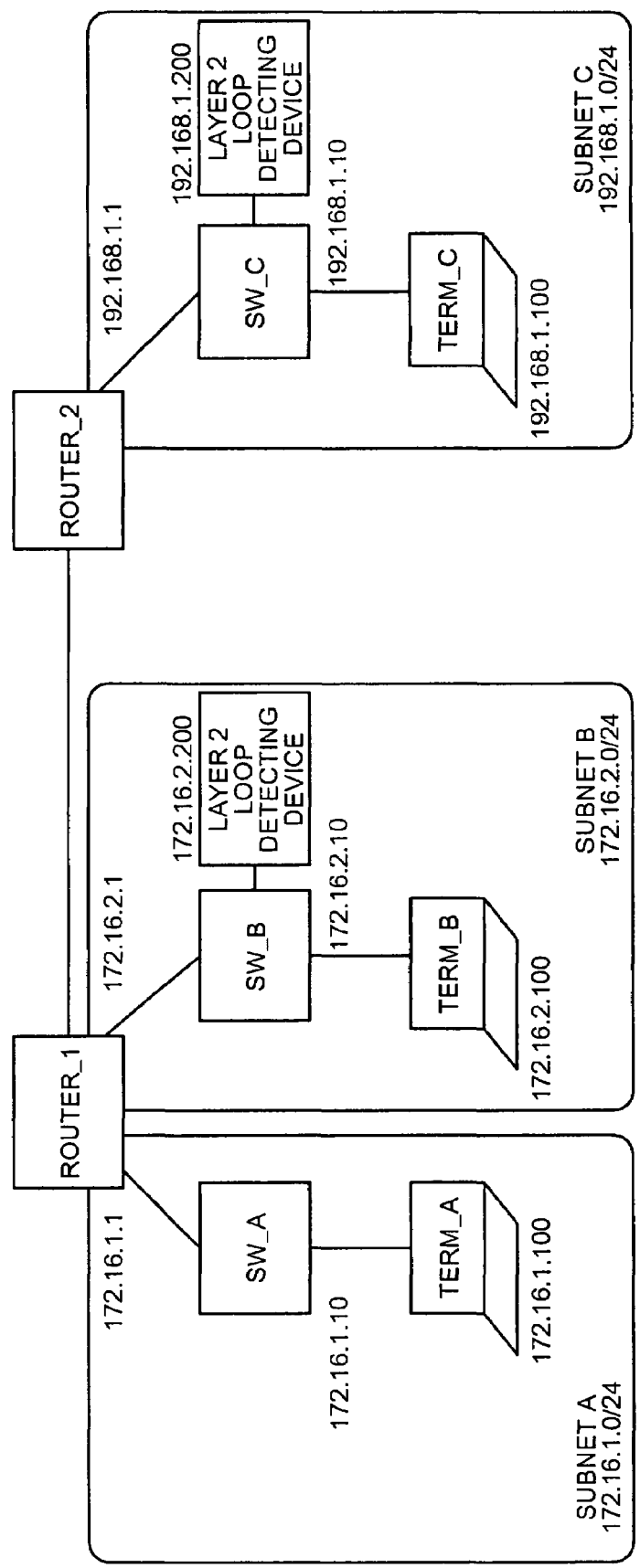
FIG. 15 is a schematic for explaining a network configuration according to an eighth embodiment of the present invention.

A configuration that one layer 2 loop detecting device detects a layer 2 loop is explained as the first to seventh embodiments; however, the present invention is not limited to the configuration. The present invention can be also applied to a configuration that plural layer 2 loop detecting devices are connected to each of the different networks and detection of a layer 2 loop in the network to which the layer 2 loop detecting device itself is connected can be performed by another layer 2 loop detecting device. That is, as shown in FIG. 15, for example, the layer 2 loop detecting device that is connected to "the subnet B" detects a layer 2 loop in "the subnet C" and the layer 2 loop detecting device that is connected to "the subnet C" detects a layer 2 loop in "the subnet B". In this event, it is possible to avoid a problem that the layer 2 loop detecting device that is connected to "the subnet B" can not detect a layer 2 loop in "the subnet B" and the layer 2 loop detecting device that is connected to "the subnet C" can not detect a layer 2 loop in "the subnet C". In addition, in this case, because the layer 2 loop detecting device has a complicated configuration, it is possible to support a breakdown of the layer 2 loop detecting device itself or a fault of the network to which the layer 2 loop detecting device is connected and operate the network with a higher availability.

Examples of detecting a layer 2 loop that occurs in one relay device are explained as the first to seventh embodiments, however, the present invention is not limited to the examples. The present invention can be also applied to the example that a layer 2 loop occurs in plural relay devices because a behavior characteristic to a layer 2 loop appears in the same way as in one relay device.

Examples of detecting a layer 2 loop in the network that includes Ipv 4 are explained as the first to seventh embodiments, however, the present invention is not limited to the examples. The present invention can be also applied to an example that a layer 2 loop is detected in a network that includes Ipv 6.

The method that the layer 2 loop detecting unit detects a condition of occurrence of a layer 2 loop as the first to seventh embodiments by employing the number of response packets having the same transmission-source address contained in the received response packets and a predetermined number (the number of request packets) is explained, however, the present invention is not limited to the method. The present invention can be also applied to a method, for example, by which the layer 2 loop detecting unit detects a condition of occurrence of a layer 2 loop by employing the number of response packets and the number of request packets, irrespective of a transmission-source address contained in response packets, such as detecting that a layer 2 loop occurs when the number of received response packets is obviously larger than the number obtained by multiplying the number of request packets with the number of devices connected to the network to be detected.

The method that the non-request-packet transmitting unit transmits non-request packets when the layer 2 loop detecting unit detects that a layer 2 loop occurs is explained as the first to seventh embodiments, however, the present invention is not limited to the method. The present invention can be also applied to a method that the non-request-packet transmitting unit does not transmit non-request packets if the layer 2 loop detecting unit detects that a layer 2 loop occurs and a method that the layer 2 loop detecting device does not include a non-request-packet transmitting unit in the first place.

The whole or part of processing that is explained to be manually performed (for example, inputting a command of transmitting request packets) can be automatically performed by a known method in each processing described in the embodiments (for example, a predetermined command is maintained in advance at a storing unit and the command is read by the storing unit based on a previously determined schedule to automatically transmit request packets). Information that includes a processing procedure, control procedure, specific title, parameter, or various types of data described in the above documents or figures can be arbitrarily changed except being particularly cited.

Each component of each illustrated device is conceptual in function and it is not always necessary to have the same configuration as physically illustrated in the figures (for example, in FIG. 2). In other words, specific forms of distributing or integrating devices are not limited to illustrated examples. The whole or part of forms can be constituted by functionally or physically distributing or integrating devices at an arbitrary unit based on various loads or using conditions (for example, a configuration of integrating the number-of-transmitted request packet storing unit 21 and the number-of-received response packet storing unit 22). Moreover, the whole or optional part of each processing function performed in each device is implemented by a program analyzed and executed in a CPU and a CPU concerned or can be implemented as hardware through wired logic.

Figure 16:
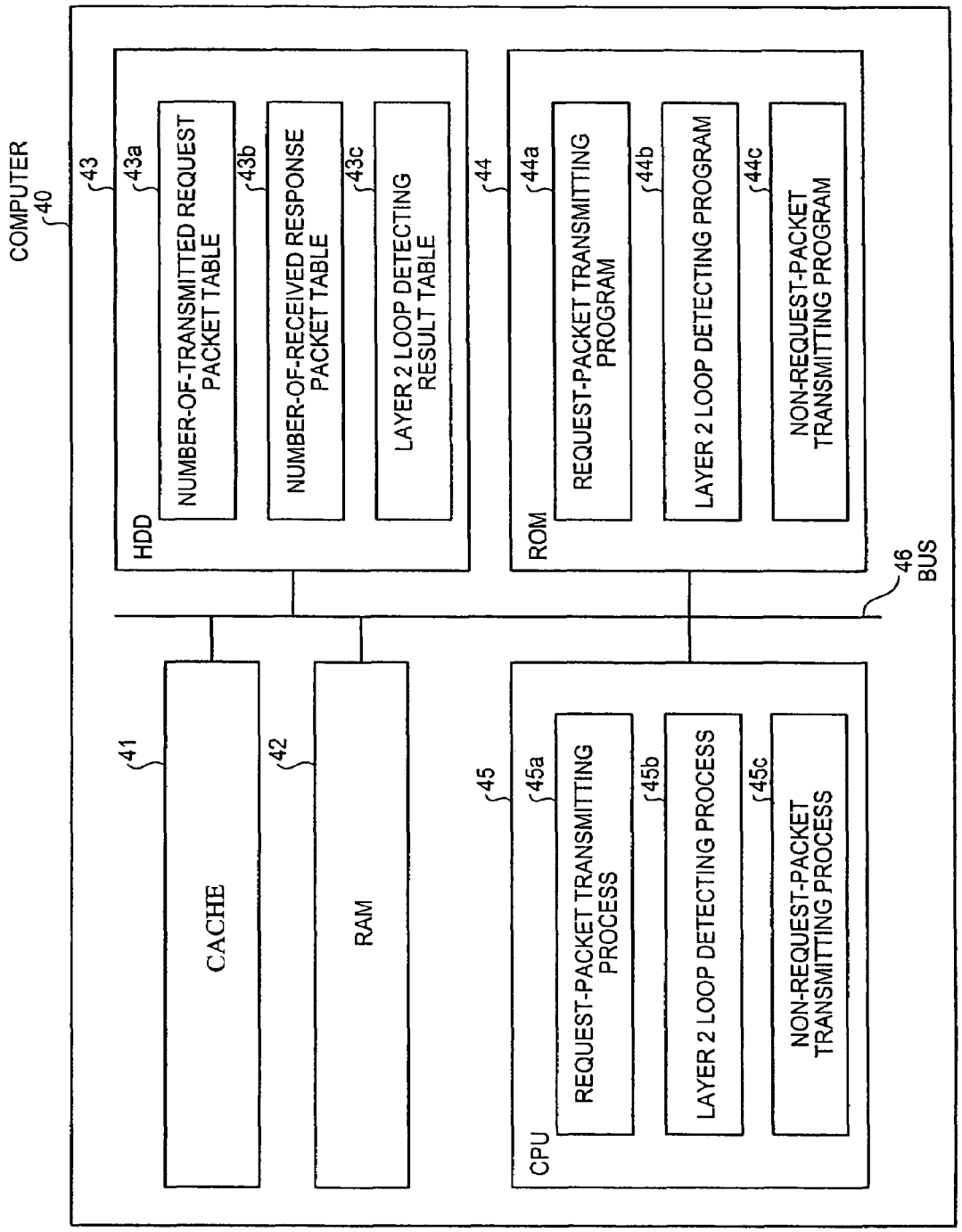
FIG. 16 is a block diagram for explaining a computer that performs a layer 2 loop detecting program.

Various processing described in the above embodiments can be implemented by performing a previously prepared program on a personal computer or a computer such as a work station. With reference to FIG. 16, an example of a computer that performs a layer 2 loop detecting program that has the same function as in the first embodiment is explained below. FIG. 16 is a block diagram for indicating a computer that performs the layer 2 loop detecting program.

As shown in FIG. 16, a computer 40 includes a cache 41, a random access memory (RAM) 42, a hard disk drive (HDD) 43, a read only memory (ROM) 44, and a central processing unit (CPU) 45 that are connected through a bus 46. In the ROM 44, the layer 2 loop detecting program that exerts the same function as in the above embodiments, that is, as shown in FIG. 16, a request-packet transmitting program 44a, a layer 2 loop detecting program 44b, and a non-request-packet transmitting program 44c are stored in advance.

The CPU 45 reads and performs these programs 44a, 44b, and 44c and then, as shown in FIG. 16, the programs 44a, 44b, and 44c become a request-packet transmitting process 45a, a layer 2 loop detecting process 45b, and a non-request-packet transmitting process 45c. Each of the processes 45a, 45b, and 45c corresponds to the request-packet transmitting unit 31, the layer 2 loop detecting unit 32, and the non-request-packet transmitting unit 33 shown in FIG. 2 respectively.

As shown in FIG. 16, the HDD 43 includes a number-of-transmitted request packet table 43a, a number-of-received response packet table 43b, and a layer 2 loop detecting result table 43c. Each of tables 43a, 43b, and 43c corresponds to the number-of-transmitted request packet storing unit 21, the number-of-received response packet storing unit 22, and the layer 2 loop detecting result storing unit 23 shown in FIG. 2 respectively.

It is not always necessary to store each of the programs 44a, 44b, and 44c in the ROM 44. The programs 44a, 44b, and 44c are stored in "another computer (or a server)" connected to the computer 40 through, for example, "a portable physical medium" such as a flexible disk (FD), a compact disk-read only memory (CD-ROM), a magneto-optical (MO) disk, a digital versatile disk (DVD), and an integrated circuit (IC) card that are inserted in the computer 40 or "a fixing physical medium" such as an HDD that is provided inside or outside the computer 40 and moreover through a public network, the Internet, a LAN, a wide area network (WAN) and the like. The computer 40 can read programs from them and perform the programs.

As described above, according to one aspect of the present invention, a layer 2 loop detecting device that detects a condition of occurrence of a layer 2 loop in a network identified by a predetermined network address divided by a layer 3 relay device that relays packets at layer 3 transmits a predetermined number of request packets, through the layer 3 relay device, that are directed to a non-unicast address that a network to be detected can receive with respect to the network to be detected that includes a monitoring network identified by a network address different from the predetermined network address and the network identified by the predetermined network address, receives response packets corresponding to the transmitted request packets through the layer 3 relay device, and detects a condition of occurrence of a layer 2 loop in the network to be detected by use of the number of received response packets and a predetermined number. This makes it possible to detect a layer 2 loop that occurs in a network different from the network to which the detecting device is connected (a network having a different network address, for example, a different subnet).

Furthermore, according to another aspect of the present invention, the layer 2 loop detecting device detects that a layer 2 loop occurs as a condition of occurrence of a layer 2 loop when the number of response packets that have the same transmission-source address among the received response packets is larger than the number of request packets. Compared with a method of not using a transmission-source address contained in response packets, though the number of devices connected to a network to be detected is uncertain, it is possible to precisely detect that a layer 2 loop occurs.

Moreover, according to still another aspect of the present invention, the layer 2 loop detecting device transmits a predetermined number of non-request packets, through the layer 3 relay device, that are directed to a non-unicast address and that do not request a response when it is detected that a layer 2 loop occurs. Thus, it is possible to converge on enlargement of a range that a layer 2 loop gives an influence on along with detection of a layer 2 loop (a large quantity of response packets flow to another network through the layer 3 relay device).

Furthermore, according to still another aspect of the present invention, the layer 2 loop detecting device detects that a layer 2 loop does not occur as a condition of occurrence of a layer 2 loop when the number of response packets having the same transmission-source address among the received response packets is equal to or less than the predetermined number. Compared with a method of not using a transmission-source address contained in the response packets, though the number of devices connected to a network to be detected is uncertain, it is possible to precisely detect that a layer 2 loop does not occur.

Moreover, according to still another aspect of the present invention, the layer 2 loop detecting device specifies a packet length of request packets to a predetermined packet length and transmits request packets and thereby it is possible to alleviate an enlarged load in a device associated with detection of a layer 2 loop (an enlarged load that is caused by adding a load of processing request packets transmitted from the layer 2 loop detecting device). That is, a load of the device that processes packets is proportional to the number of transmitting and receiving packets per hour. Therefore, for example, a predetermined packet length having a long size such as 1500 bytes is specified, enabling a reduction in an increased load of the device.

Furthermore, according to still another aspect of the present invention, the layer 2 loop detecting device repeatedly transmits request packets at a predetermined period, repeatedly receives, at a predetermined period, response packets corresponding to the request packets repeatedly transmitted at the predetermined period, and detects a condition of occurrence of a layer 2 loop at a predetermined period. This makes it possible to always monitor how a layer 2 loop occurs and early detect a layer 2 loop.

Moreover, according to still another aspect of the present invention, the layer 2 loop detecting device repeatedly transmits request packets at a period of a timeout time or less determined based on a routing protocol in a network identified by a predetermined network address. This makes it possible to properly detect a layer 2 loop. In other words, there is a possibility of request packets not reaching a network to be detected because routing processing left undone due to an effect of a layer 2 loop causes a timeout time of the routing protocol to elapse, however, for example, the layer 2 loop detecting device repeatedly transmits request packets at a shorter period than the timeout time of the routing protocol, and thereby avoids request packets not reaching the network to be detected, and can properly detect a layer 2 loop.

Furthermore, according to still another aspect of the present invention, the layer 2 loop detecting device repeatedly acquires a reception statistic of non-unicast packets, accumulated at a layer 3 relay device for each of the networks divided by the layer 3 relay device from the layer 3 relay device at a predetermined period, calculates a quantity of receiving non-unicast packets per an hour from the acquired reception statistic for each network, detects the network as a suspected network when the quantity of receiving calculated non-unicast packets is larger than a predetermined threshold, and transmits request packets to the detected suspected network. Thus, a network that has a high possibility that a layer 2 loop occurs (a suspected network) is detected and then request packets are transmitted to the suspected network. It is possible to check a useless traffic such as transmitting request packets to a network in which a layer 2 loop does not occur and efficiently detect a layer 2 loop.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for detecting a layer 2 loop in a network identified by a first network address that is divided by a layer 3 relay device that relays a packet at layer 3, the device comprising:
a request-packet transmitting unit that transmits a predetermined number of request packets having a non-unicast destination address that can be received by a target network that includes the network identified by the first network address, from a monitoring network identified by a second network address different from the first network address to the network identified by the first network address, through the layer 3 relay device; and
a layer 2 loop detecting unit that receives response packets corresponding to the request packets transmitted by the request-packet transmitting unit, through the layer 3 relay device, and detects the layer 2 loop in the target network when number of response packets having same transmission-source address is larger than the number of transmitted request packets, from among the received response packets.

2. The device according to claim 1, further comprising a non-request-packet transmitting unit that transmits, when the layer 2 loop detecting unit detects the layer 2 loop in the target network, a predetermined number of non-request packets having a non-unicast destination address, which do not require a response, to the target network through the layer 3 relay device.

3. The device according to claim 1, wherein the layer 2 loop detecting unit does not detect the layer 2 loop in the target network when the number of response packets having same transmission-source address is equal to or smaller than the number of transmitted request packets, from among the received response packets.

4. The device according to claim 1, wherein the request-packet transmitting unit specifies a packet length of the request packets to a predetermined packet length when transmitting the request packets.

5. The device according to claim 1, wherein
the request-packet transmitting unit repeatedly transmits the request packets at a predetermined cycle, and
the layer 2 loop detecting unit repeatedly receives the response packets responding to the request packets repeatedly transmitted by the request-packet transmitting unit at the predetermined cycle, and detects the layer 2 loop in the target network at the predetermined cycle.

6. The device according to claim 5, wherein the predetermined cycle is a cycle equal to or shorter than a timeout time determined by a routing protocol in the network identified by the first network address.

7. The device according to claim 1, further comprising:
a reception-statistic acquiring unit that repeatedly acquires a reception statistic of non-unicast packets accumulated at the layer 3 relay device for every networks divided by the layer 3 relay device from the layer 3 relay device at a predetermined cycle; and
a suspected-network detecting unit that calculates a reception amount of the non-unicast packets per unit time from the reception statistic acquired by the reception-statistic acquiring unit for every networks divided by the layer 3 relay device, and detects a network for which calculated reception amount of the non-unicast packets is larger than a predetermined threshold as a suspected network, wherein
the request-packet transmitting unit transmits the request packets to the suspected network detected by the suspected-network detecting unit.

8. The device according to claim 1, wherein
the target network includes at least one subnetwork identified by the first network address,
the request-packet transmitting unit transmits request packets having a broadcast destination address corresponding to the first network address to the at least one subnetwork, and
the layer 2 loop detecting unit receives response packets corresponding to the request packets from the at least one subnetwork, and detects the layer 2 loop in the at least one subnetwork identified by a transmission-source address when number of response packets having same transmission-source address is larger than the number of transmitted request packets, from among the received response packets.

9. The device according to claim 1, wherein
the target network is an upper-level network that includes a plurality of subnetworks identified by the first network address,
the request-packet transmitting unit transmits request packets having a broadcast destination address corresponding to the upper-level network as the non-unicast address to the upper-level network, and
the layer 2 loop detecting unit receives response packets corresponding to the request packets from each of the subnetworks, and detects the layer 2 loop in the subnetworks when number of response packets having same transmission-source address is larger than the number of transmitted request packets, from among the received response packets.

10. The device according to claim 1, wherein
the target network is a multicast network that includes the network identified by the first network address and that is connected to a device registered in a predetermined multicast address,
the request-packet transmitting unit transmits request packets having a multicast destination address to the multicast network, and
the layer 2 loop detecting unit receives response packets corresponding to the request packets from the multicast network, and detects the layer 2 loop in the multicast network identified by a transmission-source address when number of response packets having same transmission-source address is larger than the number of transmitted request packets, from among the received response packets.

11. A system in which a layer 2 loop detecting device detects a layer 2 loop in a network identified by a first network address that is divided by a layer 3 relay device that relays a packet at layer 3, wherein
the layer 2 loop detecting device includes
a request-packet transmitting unit that transmits a predetermined number of request packets having a non-unicast destination address that can be received by a target network that includes the network identified by the first network address, from a monitoring network identified by a second network address different from the first network address to the network identified by the first network address, through the layer 3 relay device, and
a layer 2 loop detecting unit that receives response packets corresponding to the request packets transmitted by the request-packet transmitting unit, through the layer 3 relay device, and detects the layer 2 loop in the target network when number of response packets having same transmission-source address is larger than the number of transmitted request packets, from among the received response packets, and
the layer 3 relay device includes a response-packet transmitting unit that transmits the response packets corresponding to request packets transmitted by the request-packet transmitting unit to the layer 2 loop detecting device.

12. A method of detecting a layer 2 loop in a network identified by a first network address that is divided by a layer 3 relay device that relays a packet at layer 3, the method comprising:
transmitting a predetermined number of request packets having a non-unicast destination address that can be received by a target network that includes the network identified by the first network address, from a monitoring network identified by a second network address different from the first network address to the network identified by the first network address, through the layer 3 relay device;
receiving response packets corresponding to the request packets transmitted at the transmitting, through the layer 3 relay device; and
detecting the layer 2 loop in the target network when number of response packets having same transmission-source address is larger than the number of transmitted request packets, from among the received response packets.

* * * * *